(12) United States Patent
Mori et al.

(10) Patent No.: US 6,482,327 B1
(45) Date of Patent: Nov. 19, 2002

(54) LIQUID TREATING PROCESS AND APPARATUS, AS WELL AS LIQUID TREATING SYSTEM

(75) Inventors: Toshikazu Mori; Mitsuo Tsuda, both of Shimonoseki (JP)

(73) Assignee: Proudo Co., Ltd., Yamaguchi (JP)

( * ) Notice: Subject to any disclaimer, the term of this patent is extended or adjusted under 35 U.S.C. 154(b) by 0 days.

(21) Appl. No.: 09/600,542

(22) PCT Filed: Nov. 20, 1998

(86) PCT No.: PCT/JP98/05261

§ 371 (c)(1),
(2), (4) Date: Jul. 18, 2000

(87) PCT Pub. No.: WO00/30982

PCT Pub. Date: Jun. 2, 2000

(51) Int. Cl.[7] .................................................. C02F 1/36
(52) U.S. Cl. ...................... 210/695; 204/155; 204/252; 204/272; 204/293; 205/701; 205/746; 205/752; 210/719; 210/721; 210/738; 210/748; 210/760; 210/764; 210/173; 210/192; 210/205; 210/223; 210/903; 210/906; 210/916
(58) Field of Search .................. 210/695, 702, 210/721, 738, 748, 764, 198.1, 205, 192, 916, 222, 223, 173, 760, 719, 903, 906; 204/272, 155, 293, 252; 205/701, 746, 752

(56) References Cited

U.S. PATENT DOCUMENTS

| | | | | |
|---|---|---|---|---|
| 3,523,076 A | * | 8/1970 | Goerz et al. ................ | 210/748 |
| 3,625,884 A | * | 12/1971 | Waltrip ........................ | 210/152 |
| 3,630,377 A | * | 12/1971 | Brooks ........................ | 210/262 |
| 3,772,188 A | * | 11/1973 | Edwards ...................... | 210/173 |
| 4,013,552 A | * | 3/1977 | Kreuter ....................... | 210/748 |
| 4,076,617 A | * | 2/1978 | Bybel et al. ................. | 210/760 |
| 5,130,032 A | * | 7/1992 | Sartori ........................ | 210/748 |
| 5,616,250 A | * | 4/1997 | Johnson et al. ............. | 210/695 |
| 5,888,403 A | * | 3/1999 | Hayashi ...................... | 210/695 |
| 6,030,538 A | * | 2/2000 | Held ............................ | 210/748 |
| 6,039,883 A | * | 3/2000 | Milde et al. ................. | 210/748 |
| 6,203,710 B1 | * | 3/2001 | Woodbridge ................ | 210/695 |

FOREIGN PATENT DOCUMENTS

| | | |
|---|---|---|
| JP | S54-123242 | 9/1979 |
| JP | S60-175593 | 9/1985 |
| JP | H2-284689 | 11/1990 |
| JP | H6-7779 | 1/1994 |
| JP | H10-192620 | 7/1998 |

* cited by examiner

Primary Examiner—Peter A. Hruskoci
(74) Attorney, Agent, or Firm—Koda & Androlia

(57) ABSTRACT

In a liquid treating process according to the present invention, colloidal particles in stable hydrated states or in meta-stable hydrophobic colloidal states in a liquid are rendered hydrophobic and separated from liquid molecules by an electric field formed by a microwave. The separated colloidal particles are allowed to collide against one another to become flocculated under a cavitation effect by a ultrasonic wave having a frequency in a low frequency range, and the liquid is deodorized by an electromagnetic ultrasonic wave having a frequency in a high frequency range. Therefore, it is possible to easily and reliably remove the colloidal particles dissolved in the liquid and to deodorize the liquid without need for a large-scaled equipment. For this purpose, the microwave which is an electromagnetic wave is emitted to the liquid containing the colloidal particles of water-soluble organic substances, microorganisms and the like to separate the colloidal particles from the liquid molecules and then, a ultrasonic wave having a frequency in a low frequency range is emitted to the liquid resulting from the separation of the colloidal particles to flocculate the colloidal particles, and an electromagnetic ultrasonic wave having a frequency in a high frequency range is emitted to the liquid to deodorize the liquid.

53 Claims, 25 Drawing Sheets

Fig. 26

| Object of Analysis/Run No. | | First | Second | Third | Fourth | Fifth |
|---|---|---|---|---|---|---|
| Bio-chemical oxygen demand BOD (mg/l) | Raw water | 7800 | 20000 | 27000 | 17000 | 12000 |
| | Water at outlet of flocculating device | - | 8000 | 10000 | 7800 | 5300 |
| | Released water | 3.4 | 16 | 31 | 2.7 | - |
| Biological oxygen demand COD (mg/l) | Raw water | 1800 | 5700 | 13000 | 9000 | 5900 |
| | Water at outlet of flocculating device | - | 2000 | 2900 | 2900 | 1500 |
| | Released water | 30 | 13 | 19 | 1.8 | - |
| Mass of suspended solids SS (mg/l) | Raw water | 1700 | 14000 | 25000 | 16000 | 11000 |
| | Water at outlet of flocculating device | - | 1600 | 3200 | 1000 | 720 |
| | Released water | 40 | 36 | - | 1.7 | - |
| Nitrogen content T-N (mg/l) | Raw water | - | 3100 | 4400 | 2600 | 1900 |
| | Water at outlet of flocculating device | - | 1300 | 1600 | 1100 | 1100 |
| | Released water | - | 8.9 | 14 | 7.9 | - |
| Phosphorus content T-P (mg/l) | Raw water | 6200 | 400 | 690 | 580 | 480 |
| | Water at outlet of flocculating device | - | 100 | 67 | 130 | 200 |
| | Released water | - | 1.3 | 0.44 | 0.068 | - |
| Number of colon bacillus (No./cm³) | Raw water | - | 560000 | 240000 | 900000 | 360000 |
| | Water at outlet of flocculating device | - | 280000 | 160000 | 440000 | 250000 |
| | Released water | 290 | 0 | 0 | 0 | 0 |

Fig. 27

| Subject of analysis /Sampling site | Raw water | At outlet of suspended solid removing device | At outlet of flocculating device | At outlet of flocculation accerating device | At outlet of first settling device | At outlet of second settling device (released water) |
|---|---|---|---|---|---|---|
| BOD (mg/l) | 17000 | 7800 | 3100 | 280 | 43 | 2.7 |
| COD (mg/l) | 9000 | 2900 | 710 | 150 | 29 | 1.8 |
| SS (mg/l) | 16000 | 1000 | 400 | 130 | 31 | 1.7 |
| T-N (mg/l) | 2600 | 1100 | 480 | 120 | 18 | 7.9 |
| T-P (mg/l) | 580 | 130 | 37 | 8.7 | 1.1 | 0.068 |
| Number of colon bacillus | 900000 | 440000 | 1 | 0 | 2 | 0 |
| Hydrogen ion concentration (pH) | 6.5 (at 18°C) | 7.2 (at 18°C) | 7.4 (at 18°C) | 7.7 (at 18°C) | 7.4 (at 18°C) | 7.4 (at 18°C) |
| TSS (mg/l) | 19000 | 4800 | 2300 | 1300 | 530 | 330 |
| ORP (mg/l) | −290 (at 16°C) | −350 (at 20°C) | 92 (at 20°C) | 160 (at 20°C) | 180 (at 22°C) | 180 (at 22°C) |

LIQUID TREATING PROCESS AND APPARATUS, AS WELL AS LIQUID TREATING SYSTEM

FIELD OF THE INVENTION

The present invention relates to a liquid treating process and apparatus as well as a liquid treating system, and particularly, to a liquid treating process and apparatus as well as a liquid treating system which are suitable for purifying not only waters in a river, a lake and a marsh, but also a high-concentration drainage such as a stock farming drainage and an industrial drainage, and another liquid containing water-soluble organic substances and microorganisms.

BACKGROUND OF THE INVENTION

There are conventionally proposed processes and systems for purifying a stock farming drainage containing feces and urine of cattle, pig and the like, or an industrial drainage containing chemical substances such as a detergent and an industrial waste liquid.

Such a conventional liquid treating system will be described below with the treatment of a pig-culture drainage taken as an example. As shown in FIG. 28, the conventional water treating system for treating the pig-culture drainage comprises a filtering means 131 for removing suspended solids by passing a raw water through a screen 135 or the like, a activated-sludge treating means 132 for decomposing water-soluble organic substances by aerobic bacteria, a settling/separating means 133 for settling the water-soluble organic substances separated from raw water by the decomposition to separate the water and a sediment from each other, and a dehydrating means 134 for removing water from the sediment.

These treating means will be described below in detail. In the filtering means 131, the suspended solids are caught by the screen 135 during passage of the raw water containing the suspended solids such as feces and urine through the screen 135. The raw water depleted of the suspended solids is once stored in a storage tank 136 and then transferred to a metering tank 137, from which an amount of the water capable of being treated by an activated sludge is allowed to flow into an activated-sludge treating tank 138 as the activated-sludge treating means 132. In the activated-sludge treating tank 138, aerobic bacteria decompose the water-soluble organic substances such as a nitrogen compounds contained in the raw water. The raw water subjected to the decomposition by the bacteria in this treating means is fed to a settling tank 139 as the settling-separating means 133, where the water-soluble organic substances and the like are settled to the bottom of the settling tank 139 and separated from the water. The resulting water is disinfected and then discharged to a river or the like, and the sediment is transported to the dehydrating means 134, where the sediment is dehydrated into a solid by a dehydrator 140 and then discharged.

In the conventional water treating system, a washing water from the dehydrator 140 is permitted to flow into the storage tank 136 in order to avoid increases in building site and cost due to an increase in size of the activated-sludge treating tank 138.

Therefore the so-called high-concentration raw water having a high organic substance load is diluted by the washing water from the dehydrator 140 and hence, the burden of the aerobic bacteria for decomposing the organic substances in the activated-sludge treating means 132 is alleviated.

However, the conventional water treating system suffers from the following problem: The high-concentration raw water cannot be diluted sufficiently by only the washing water from the dehydrator 140, and a more amount of water is required. If the amount of water diluting the raw water is increased, the amount of water to be purified is also increased. As a result, the size of the water treating equipment is increased, thereby causing increases in initial cost such as building cost, and in running cost such as consumed electric power and city water charges for treating the liquid.

In addition, when a high-concentration sewage is treated biologically, it is difficult to conduct the maintenance and management, and if the treating system is once fallen into disorder, several months are required for the recovery. During this period, the water purified incompletely is discharged into a river, resulting in a possibility that an environment pollution problem is arisen.

To solve such problem, a treating process has been proposed which comprises chemically flocculating and separating high-molecular organic substances in water using a chemical agent such as a high-molecular flocculating agent or the like to reduce the concentration. However, this process suffers from a problem that it is delicate to set the type of the chemical agent and the amount of chemical thrown relative to the concentration of the organic substances, and it is difficult to change the type and the amount in accordance with a variation in concentration. Another problem is that if the remaining agent is incorporated into the activated-sludge treating tank, the microorganisms cannot be decomposed effectively and may be died out.

Further, there is a proposed process which involves decomposing organic substances using anaerobic microorganisms in place of the aerobic microorganism. However, this process suffers from a problem that a raw water must be stored for a long period in a large-sized tank and for this reason, a very wide site is required, and an odor measure must be taken.

SUMMARY OF THE INVENTION

The present invention has been accomplished with such problems in view, and it is an object of the present invention to provide a liquid treating process and apparatus as well as a liquid treating system, wherein the size of the liquid treating equipment can be reduced to reduce the initial cost and the running cost, and water-soluble organic substances, microorganisms and the like in a liquid can be reliably removed by a simple operation, and moreover, the deodorizing, decolorizing, sterilizing, disintegrating, and oxidizing and reducing treatments of the liquid can be carried out.

To achieve the above object, according to a first aspect and feature of the present invention, there is provided a liquid treating process comprising the steps of emitting an electromagnetic wave such as a microwave to a liquid containing colloidal particles of water-soluble organic substances, microorganisms and the like to separate the liquid into the colloidal particles and liquid molecules, emitting an ultrasonic wave in a low frequency range to the liquid resulting from the separation to flocculate the colloidal particles, and emitting an electromagnetic ultrasonic wave in a high frequency range to the liquid to deodorize the liquid.

The term "electromagnetic ultrasonic wave" used herein is defined to represent a wave made by synthesis of a magnetic flux generated by a permanent magnet or an electromagnet with an ultrasonic wave generated by a ultrasonic wave generator. The term "colloidal particles" used herein is defined to represent fine particles of water-soluble organic substances dispersed in the liquid, and particles of substances other than the liquid molecules such as microorganisms and fine algae. The particles are in stable hydrated states or in meta-stable hydrophobic colloidal states in the liquid.

With such process employed, the electric field formed by the microwave renders hydrophobic the colloidal particles in stable hydrated states or in meta-stable hydrophobic colloidal states in the liquid to separate them from the liquid molecules. The ultrasonic wave in the low frequency range causes the separated colloidal particles to collide against one another by a cavitation effect, thereby flocculating the colloidal particles, and the electromagnetic ultrasonic wave in the high frequency range deodorizes the liquid. Therefore, it is possible to easily and reliably remove the colloidal particles dissolved in the liquid and to deodorize the liquid without need for a large-scaled equipment.

In addition, according to a second aspect and feature of the present invention in addition to the first feature, the ultrasonic wave in the low frequency range has a frequency equal to or lower than 100 kHz, and the electromagnetic ultrasonic wave in the high frequency range has a frequency in a range of 3 M to 300 MHz. With such feature, the ultrasonic wave and electromagnetic ultrasonic wave are irradiated in more effective frequencies to the liquid and hence, the separated fine colloidal particles in the liquid can be flocculated and removed more rapidly and reliably, and the liquid can be deodorized more effectively.

According to a third aspect and feature of the present invention, in addition to the first or second feature, the microwave which is the electromagnetic wave and the ultrasonic wave in the low frequency range are emitted to the liquid containing the colloidal particles to separate and flocculate the suspended solids; an electromagnetic ultrasonic wave in the high frequency range is emitted to the liquid to deodorize the liquid, and a high-voltage pulse is applied to the liquid to separate off nitrogen compounds and at the same time, to produce ozone to deodorize and sterilize the liquid. With such feature, an electric field generated by the high-voltage pulse accelerates the flocculation and separation of the colloidal particles, and separates off the nitrogen compounds contained in the liquid and further, easily deodorizes and sterilizes the liquid.

According to a fourth aspect and feature of the present invention, in addition to the third feature, after the application of the high-voltage pulse to the liquid, the liquid is passed through an intensive magnetic field, whereby the liquid is subjected to a disintegrating treatment. With such feature, the intensive magnetic field electrically charges the liquid to finely cut the bonds between the molecules. Therefore, the quality of the treated liquid can be enhanced, whereby the treated liquid can be reused in a wider field.

According to a fifth aspect and feature of the present invention, there is provided a liquid treating apparatus comprising a microwave generator for generating a microwave which is an electromagnetic wave to separate a liquid containing colloidal particles into the colloidal particles and liquid molecules, a low-frequency range ultrasonic wave generator for generating a ultrasonic wave in a low frequency to flocculate the colloidal particles, and a high-frequency range electromagnetic ultrasonic wave generator for generating an electromagnetic ultrasonic wave in a high frequency range to remove an offensive odor from the liquid.

With such arrangement, an electric field of the microwave formed by the microwave generator renders hydrophobic the colloidal particles which are in stable hydrated states or in meta-stable hydrophobic colloidal states in the liquid, thereby separating the colloidal particles from the liquid molecules, and causes the separated colloidal particles to collide against one another by a cavitation effect, thereby flocculating the colloidal particles, and the electromagnetic ultrasonic wave in the high frequency range generated from the high-frequency range electromagnetic ultrasonic wave generator deodorizes the liquid. Therefore, it is possible to easily and reliably remove the colloidal particles dissolved in the liquid and to deodorize the liquid without need for a large-scaled equipment.

According to a sixth aspect and feature of the present invention, in addition to the fifth feature, the ultrasonic wave in the low frequency range generated from the low frequency range ultrasonic wave generator has a frequency equal to or lower than 100 kHz, and the electromagnetic ultrasonic wave in the high frequency range generated from the high frequency range electromagnetic ultrasonic wave generator has a frequency in a range of 3 M to 300 MHz. With such feature, the ultrasonic wave and the electromagnetic ultrasonic wave are irradiated in more effective frequencies to the liquid. Therefore, the separated fine colloidal particles in the liquid can be flocculated and removed rapidly and reliably, and the liquid can be deodorized more effectively.

According to a seventh aspect and feature of the present invention, in addition to the fifth or sixth feature, the liquid treating apparatus further includes a high-voltage pulse generator for generating a high-voltage pulse to separate the nitrogen compounds from the liquid and at the same time, to produce ozone to deodorize and sterilize the liquid. With such feature, an electric field generated by the high-voltage pulse can accelerate the flocculation and separation of the colloidal particles, and separate off the nitrogen compounds contained in the liquid by a simple device and further, easily deodorize and sterilize the liquid.

According to an eighth aspect and feature of the present invention, in addition to any of the fifth to seventh features, the liquid treating apparatus further includes a magnetic field forming means for forming a magnetic field for the disintegrating treatment of the liquid. With such arrangement, an intensive magnetic field formed by the magnetic field forming means electrically charges the liquid to finely cut the bonds between the molecules. Therefore, the quality of the treated liquid can be enhanced, and the treated liquid can be reused in a wider field.

According to a ninth aspect and feature of the present invention, there is provided a liquid treating system comprising a separating means for emitting a microwave which is an electromagnetic wave to a liquid containing colloidal particles to separate the liquid into the colloidal particles and liquid molecules, a flocculating means for emitting a ultrasonic wave in a low frequency range to the liquid resulting from the separation of the colloidal particles, thereby flocculating the colloidal particles, a deodorizing means for emitting an electromagnetic ultrasonic wave in a high frequency range to the liquid to deodorize the liquid, a high-voltage pulse treating means for applying a high-voltage pulse to the liquid to separate and remove nitrogen compounds from the liquid and at the same time, to produce ozone to deodorize and sterilize the liquid, and a flocculate discharging means for attracting flocculates of the colloidal particles by a magnetic force to discharge them. With such arrangement, an electric field formed by the microwave emitted from the separating means renders, hydrophobic, the colloidal particles which are in stable hydrated states or in meta-stable hydrophobic colloidal states in the liquid, thereby separating the colloidal particles from the liquid molecules. A cavitation effect of the ultrasonic wave emitted from the flocculating means causes the separated colloidal particles to collide against one another to flocculate them, and the electromagnetic ultrasonic wave in the high frequency range emitted from the deodorizing means deodorizes the liquid. Further, an electric field formed by the high-voltage pulse applied by the high-voltage pulse treating means accelerates the flocculation and separation of the colloidal particles, and separates off the nitrogen compounds contained in the liquid and further, easily deodorizes and sterilizes the liquid by generating ozone. Therefore, the scale of the liquid treating system can be reduced to reduce the initial cost and the running cost, and the colloidal particles in the liquid can be removed reliably, and further, the liquid can be deodorized, decolorized and sterilized.

According to a tenth aspect and feature of the present invention, in addition to the ninth feature, the liquid treating system further includes a disintegrating means for subjecting the liquid to a disintegrating treatment by passing the liquid through an intensive magnetic field. With such arrangement, the intensive magnetic field causes the finely disintegrating treatment of the liquid. Therefore, the quality of the treated liquid can be enhanced and hence, the treated liquid can be utilized in a wider field.

According to an eleventh aspect and feature of the present invention, in addition to the ninth or tenth feature, the liquid treating system further includes an oxidizing/reducing means for delivering and receiving electrons to and from the electrically charged liquid to effect an oxidizing/reducing reaction. With such arrangement, the liquid in an electrically charged state liable to cause a chemical reaction can be restored to a stable liquid difficult to chemically react.

According to a twelfth aspect and feature of the present invention, in addition to any of the ninth or eleventh features, the ultrasonic wave in the low frequency range emitted by the flocculating means has a frequency equal to or lower than 100 kHz, and the electromagnetic ultrasonic wave in the high frequency range emitted by the deodorizing means has a frequency in a range of 3 M to 300 MHz. With such feature, the ultrasonic wave and the electromagnetic ultrasonic wave are irradiated in more effective frequencies to the liquid. Therefore, the separated fine colloidal particles in the liquid can be flocculated and removed more rapidly and reliably, and the liquid can be deodorized more effectively.

According to a thirteen aspect and feature of the present invention, there is provided a liquid treating apparatus comprising an AC high-voltage electrode means for applying a high-voltage pulse of a high-frequency to flocculate and separate colloidal particles of water-soluble organic substances, microorganisms and the like from a colloidal particle-containing liquid and to destruct cells of the microorganisms or the like. With such arrangement, an electric field generated by the high-voltage pulse of the high-frequency electrically charges the colloidal particles in the liquid to break the stable hydrated states or the meta-stable hydrophobic colloidal states, thereby rendering the liquid hydrophobic. Thus, the colloidal particles can be separated and flocculated, and the cells of microorganisms such as water bloom, colon bacillus and the like can be destructed and died. In addition, the colloidal particles are separated from the liquid molecules and hence, the liquid can be deodorized and decolorized.

According to a fourteenth aspect and feature of the present invention, there is provided a liquid treating system comprising a flocculating device having an electrically charging/cell-destructing means which includes an AC high-voltage electrode means for applying a high-voltage pulse of a high frequency to separate and flocculate colloidal particles of water-soluble organic substances, microorganisms and the like from a colloidal particle-containing liquid and to destruct cells of the microorganisms; a flocculation accelerating device which includes a microwave separating means for emitting a microwave which is an electromagnetic wave to the liquid to separate the liquid into the colloidal particles and liquid molecules, a first ultrasonic wave flocculating means for emitting a ultrasonic wave of a frequency in a range of 40 k to 1,200 kHz to the liquid treated by the emission of the microwave, thereby flocculating the colloidal particles, and a deodorizing means adapted to emit an electromagnetic ultrasonic wave in a high frequency range to the liquid; and a settling device which includes a flocculate settling means adapted to pass the liquid containing flocculates of the colloidal particles through a lattice-shaped electrically separating membrane having a high voltage applied thereto, thereby adsorbing the flocculates to the electrically separating membrane, and to settle the flocculates by changing the direction of application of the high voltage. With such arrangement, an electric field generated by the high-voltage pulse of the high frequency in the flocculating device electrically charges the colloidal particles in the liquid. Therefore, the stable hydrated states or the meta-stable hydrophobic colloidal states of the colloidal particles can be broken, whereby the liquid can be rendered hydrophobic to flocculate the colloidal particles, and the cells of the microorganisms such as water bloom, colon bacillus and the like can be destructed and died. Further, the microwave and the ultrasonic wave accelerate the flocculation and separation of the colloidal particles in the flocculation accelerating device. In addition, in the flocculation accelerating device, the liquid can be deodorized and decolorized, and the electromagnetic ultrasonic wave mainly acts to fragmentize or decompose amino acid in the colloidal particles to deodorize the colloidal particles themselves and hence, it is possible to completely remove the odor of the liquid. Further, in the flocculate treating/settling means, the electrically separating membrane having the high voltage applied thereto reliably adsorbs the flocculates of the colloidal particles, and the flocculates can be settled rapidly by changing the direction of application of the voltage.

According to a fifteenth aspect and feature of the present invention, in addition to the fourteenth feature, the flocculation accelerating device is provided with an oxidizing/reducing means including a DC high-voltage electrode means for applying a DC-high voltage to the liquid containing the colloidal particles to promote the oxidizing/reducing reaction of the liquid and to decompose carbon compounds. With such arrangement, the electric charging of the liquid is promoted by the promotion of the oxidizing/reducing reaction, thereby rapidly advancing the flocculation and separation of the colloidal particles. The decomposition of the carbon compounds makes a short-circuiting difficult to occur and hence, the high voltage can be applied smoothly.

According to a sixteenth aspect and feature of the present invention, in addition to the fourteenth or fifteenth feature, the flocculation accelerating device is provided with a disintegrating/electrically charging means adapted to permit the liquid containing the colloidal particles to be passed therethrough, while being mixed by blades embedded in a plurality of magnets in a direction of flowing of the liquid in a pipe having a magnetic field formed therein, thereby disintegrating the liquid molecules and the colloidal particles to electrically charge them, and adsorbing the colloidal particles to one another. With such arrangement, the liquid molecules and the colloidal particles can be finely disintegrated by an emulsion effect of emulsifying the liquid, and are electrically charged, whereby the colloidal reparticles having the same potential can be strongly adsorbed to one another.

According to a seventeenth aspect and feature of the present invention, in addition to any of the fourteenth to sixteenth features, the flocculation accelerating device is provided with a second ultrasonic wave flocculating means adapted to emit ultrasonic waves as longitudinal waves having frequencies of 28 kHz, 40 kHz and 48 kHz and a ultrasonic wave as a lateral wave having a frequency of 100 kHz to the liquid containing the colloidal particles. With such arrangement, the colloidal particles in separated states can be flocculated by a cavitation effect of the ultrasonic wave having the frequency suitable for the concentration of the raw water, and the flocculates can be separated from the liquid molecules.

According to an eighteenth aspect and feature of the present invention, in addition to any of the fourteenth to seventeenth features, the flocculation accelerating device has a completely separating means disposed therein for completely separating the colloidal particles from the liquid molecules by emitting an electromagnetic wave having a frequency in a range of 100 M to 500 MHz to the liquid containing the colloidal particles to generate an induction plasma. With such arrangement, the induction plasma generated by the electromagnetic wave completely separates the flocculates of the colloidal particles from the liquid molecules, so that even if the liquid is agitated, the flocculates cannot be dissolved again.

According to a nineteenth aspect and feature of the present invention, in addition to any of the fourteenth to eighteenth features, the AC high-voltage electrode means comprises two anodes and a single cathode. With such arrangement, it is possible to prevent the wearing of the AC high-voltage electrodes to prolong the life of the electrodes and to apply the AC high voltage over a wider range to widen the area to be subjected to the flocculating treatment by switching over the polarities of the electrodes.

According to a twentieth aspect and feature of the present invention, in addition to any of the fourteenth to nineteenth features, the DC high-voltage electrode means comprises two anodes and a single cathode. With such arrangement, it is possible to prevent the wearing of the DC high-voltage electrodes to prolong the life of the electrodes and to apply the DC high voltage over a wider range to widen the area to be subjected to the flocculating treatment by switching over the polarities of the electrodes.

According to a twenty first aspect and feature of the present invention addition to any of the fifteenth to twentieth features, the cathode of the AC high-voltage electrode means is formed of a magnesium-based material. With such arrangement, magnesium is dissolved into the liquid and hence, the flocculation of the separated colloidal particles can be promoted further.

According to a twenty second aspect and feature of the present invention, in addition to any of the fifteenth to twenty first features, the cathode of the DC high-voltage electrode means is formed of a magnesium-based material. With such arrangement, magnesium is dissolved into the liquid and hence, the flocculation of the separated colloidal particles can be promoted further.

According to a twenty third aspect and feature of the present invention, in addition to any of the fourteenth to twentieth features, each of the electrodes of the AC high-voltage electrode means is formed of a platinum-titanium alloy material. With such arrangement, the delivery and reception of electron can be promoted by 10 times as compared with a usual case, while inhibiting the wearing of the electrodes, whereby the electric charging of the liquid can be promoted further.

According to a twenty fourth aspect and feature of the present invention, in addition to any of the fifteenth to twentieth features, each of the electrodes of the DC high-voltage electrode means is formed of a copper-tungsten alloy material. With such arrangement, the delivery and reception of electron can be promoted by 10 times as compared with a usual case, while inhibiting the wearing of the electrodes, whereby the electric charging of the liquid can be promoted further.

According to a twenty fifth aspect and feature of the present invention addition to any of the fifteenth to twenty fourth features, the microwave generated in the flocculation accelerating device has a frequency in a range of 2.4 G to 10.5 GHz. With such arrangement, the microwave is emitted at a more effective frequency to the colloidal particles and hence, the separation of the colloidal particles and the liquid molecules from each other can be carried out further effectively.

BRIEF DESCRIPTION OF THE DRAWINGS

FIG. 26 is a table showing results of a demonstrating test on the treatment of a pig-culture drainage in the second embodiment, e.g., the amount of water-soluble organic substances in a raw water, in a water at an inlet of the flocculating device and in a water at an outlet of the second settling device;

FIG. 27 is a table showing the results of the third run of the demonstrating test on the treatment of the pig-culture drainage in the second embodiment, e.g., the amount of water-soluble organic substances in the water at each of the outlets of the devices.

DETAILED DESCRIPTION OF THE PREFERRED EMBODIMENT

The present invention will now be described by way of A first embodiment with reference to FIGS. 1 to 14.

The present invention can be utilized for purification of not only service water in a pool or the like, but also various liquids, e.g., a drainage from the stock farming such as culture of pig, cattle and the like, an industrial drainage such as a waste liquid from a factory, and a waste oil. For convenience, the water purifying system for a pig-culture drainage or an industrial drainage will be described as one example.

Figure 1:
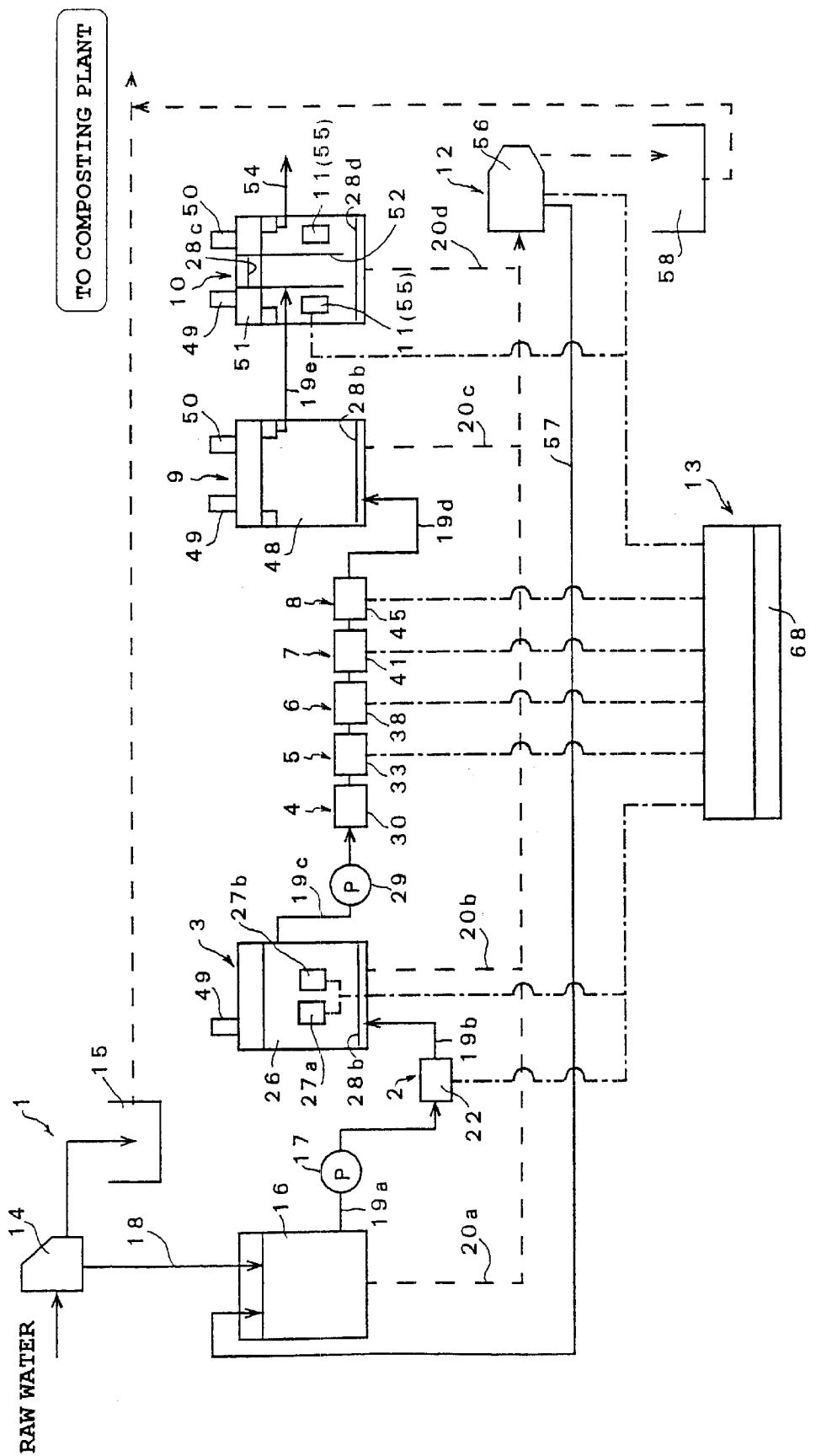
FIG. 1 is a flow diagram showing a first embodiment of a liquid treating system according to the present invention.

FIG. 1 shows a first embodiment of the liquid treating system according to the present invention. The first embodiment comprises a filtering means 1 for removing suspended solids having a large specific gravity from a raw water including urine of a pig by a screen or the like, a first separating means 2 adapted to emit a microwave which is an electromagnetic wave to the raw water which is still muddy after being filtered, thereby separating colloidal particles and water molecules from each other by an electric field generated by the microwave, a first flocculating means 3 for flocculating the colloidal particles by emitting an ultrasonic wave in a low frequency range to the raw water subjected to the separation, a disintegrating/electrically charging means 4 for electrically charging the liquid to bring the water molecules and the colloidal particles into a regularly ordered arrangement, while disintegrating the water molecules and the colloidal particles in the raw water by the mixing of the water, a second separating means 5 adapted to emit the microwave which is the electromagnetic wave, again to the water containing the water molecules and the colloidal particles disintegrated and brought into the regularly ordered arrangement, thereby separating the fine colloidal particles and the water molecules from each other, a deodorizing means 6 adapted to emit an electromagnetic ultrasonic wave in a high frequency range to the water subjected to the separating treatment to remove an offensive odor from the subject water (which means a water to be treated, hereinafter), a second flocculating means 7 adapted to emit a ultrasonic wave in a low frequency range to the water subjected to the deodorizing treatment to flocculate the colloidal particles and to disperse the resulting flocculates from the water molecules, a high-voltage pulse treating means 8 for applying a high-voltage pulse to the subject water to separate off nitrogen compounds from the subject water and to deodorize and sterilize the subject water by producing ozone, a flocculate discharging means 9 adapted to attract and settle the flocculates including metal substances such as heavy metal of the colloidal particles by a magnetic force to discharge them, a water molecule disintegrating means 10 for further disintegrating the water molecules also called a cluster by the action of the magnetic field to produce an activated water, an oxidizing/reducing means 11 for subjecting the subject water ionized by the electrically charging treatment to an oxidizing/reducing reaction to restore the water to a stable state, a dehydrating means 12 for dehydrating the sediments comprising the colloidal particles, and a centralized control means 13 connected to the above-described treating means for controlling the operations of the treating means.

The filtering means 1 is comprised of a filtering element 14 such as a screen or a filter for filtering the raw water, a feces-dregs receiving section 15 for discharging suspended solids filtered of f, and a raw water tank 16 for storing the filtered raw water, as shown in FIG. 1.

The filtering means 1 is adapted to filter off the suspended solids separated from the water and floating on the raw water to discharge the floating solids to the feces-dregs receiving section 15. The raw water filtered by the filtering element 14 is once stored in the raw water tank 16 and then transported to the first separating means 2 for a subsequent treating stage by a raw water feeding pump 17. For this purpose, a flow-in pipe 18 is connected to an upper portion of the raw water tank 16 for permitting the filtered raw water to flow into the raw water tank 16, and a first transporting pipe 19a is connected to a lower portion of a side of the raw water tank 16 for permitting the raw water to be transported to the subsequent treating stage by an suction force of the raw water feeding pump 17.

A first discharge pipe 20a for discharging the sediments is connected to a bottom of the raw water tank 16, so that the sediments are transported through the first discharge pipe 20a to the hydrating means 12.

The water resulting from the dehydration of the sediments by a dehydrator 56 (which will be described hereinafter) of the dehydrating means 12 and the water which has washed the dehydrator 56 are permitted to flow into the raw water tank 16 and utilized to dilute the raw water.

The first separating means 2 will be described below.

Figure 2:
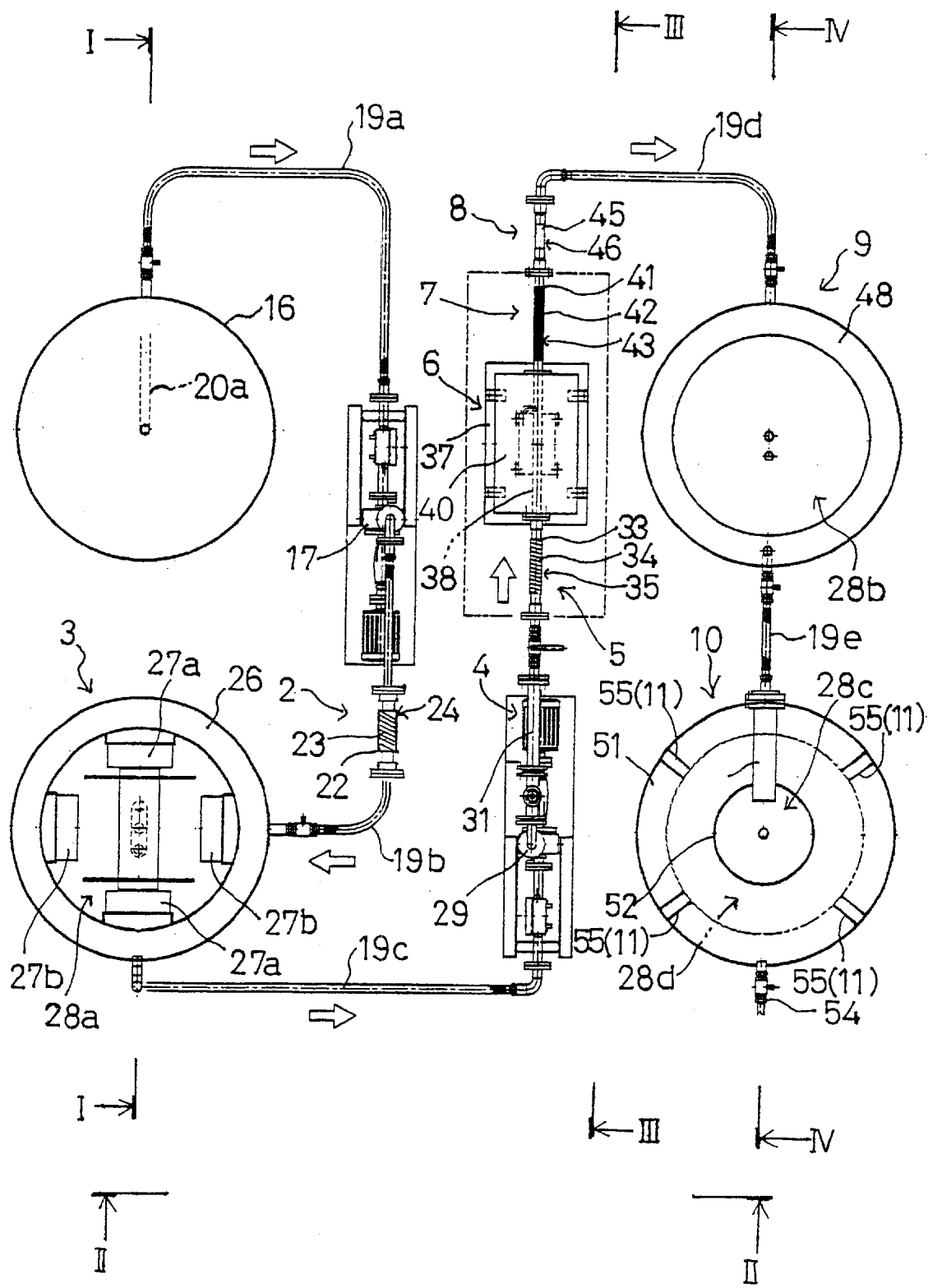
FIG. 2 is a plan view showing essential portions of the first embodiment of the liquid treating system according to the present invention.

A first separating pipe 22 is disposed in the first separating means 2 and connected to the first transporting pipe 19a, as shown in FIGS. 1 and 2. An electromagnetic coil 23 is wound around an outer periphery of the first separating pipe 22, and a circular pipe-shaped first microwave generator 24 is disposed on the outer periphery of the first separating pipe 22. The first microwave generator 24 is comprised of a magnet formed of a neodymium plate or the like, and has an upper portion acting as an N pole and a lower portion acting as an S pole. A microwave having a frequency in a range of 300 MHz to 16 GHz, more preferably in a range of 2.4 G to 10.5 GHz from the viewpoint of the separation of the colloidal particles and further preferably a frequency of 10.5 GHz, is generated from the first microwave generator 24. A composite field comprising a magnetic field and an electric field is formed by the microwave which is an electromagnetic wave generated by such permanent magnet or electromagnet, thereby separating the colloidal particles and the water molecules in the raw water from each other.

Figure 7:
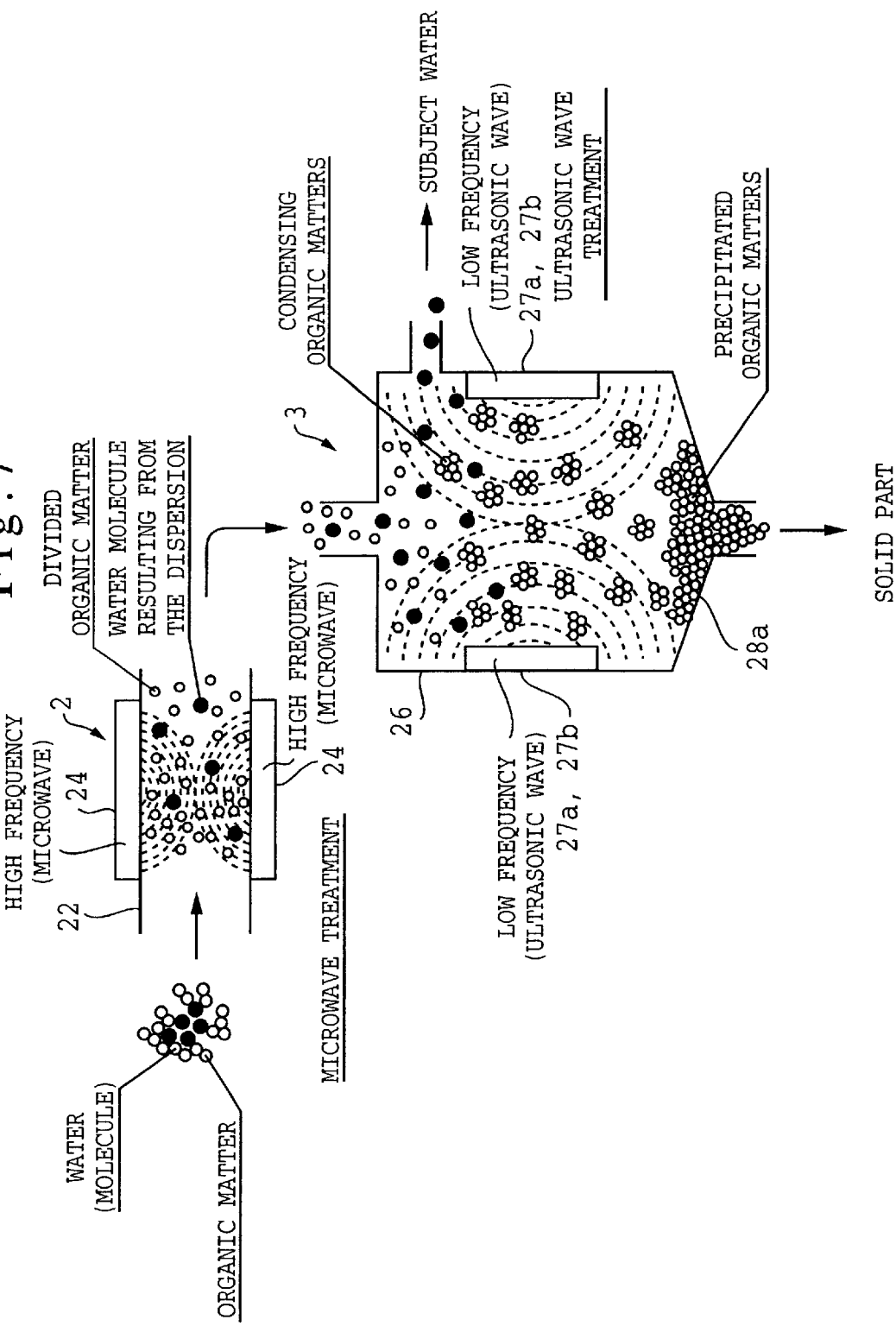
FIG. 7 is a diagrammatic illustration showing a first separating means and a first flocculating means in the first embodiment of the liquid treating system according to the present invention.

It is believed that the microwave has mainly an effect of subjecting the raw water to the disintegrating treatment to electrically charge the colloidal particles and the water molecules to disperse them sporadically in the raw water, as shown in FIG. 7.

The water resulting from the dispersion is transported through a second transporting pipe 19b connected to the first separating pipe 22 to the first flocculating means 3.

The first flocculating means 3 will be described below.

As shown in FIGS. 1 to 3A, a first flocculating tank 26 is disposed in the flocculating means 3, and the second transporting pipe 19b is connected to a bottom of the first flocculating tank 26, so that the subject water flows from the first separating pipe 22 into the second transporting pipe 19b.

Figure 3:
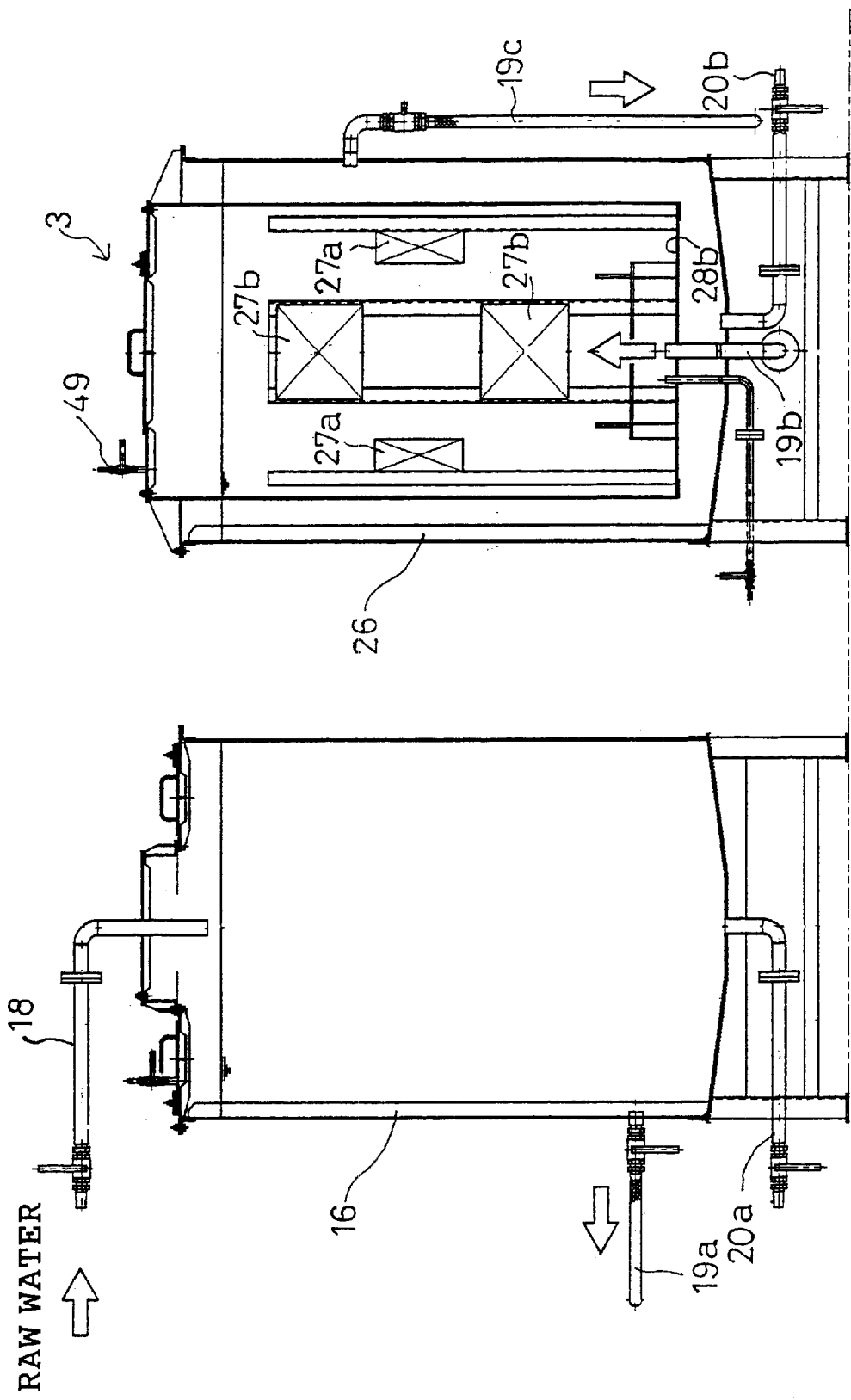
FIG. 3 is a sectional view taken along a line I—I in FIG. 2.
Figure 4:
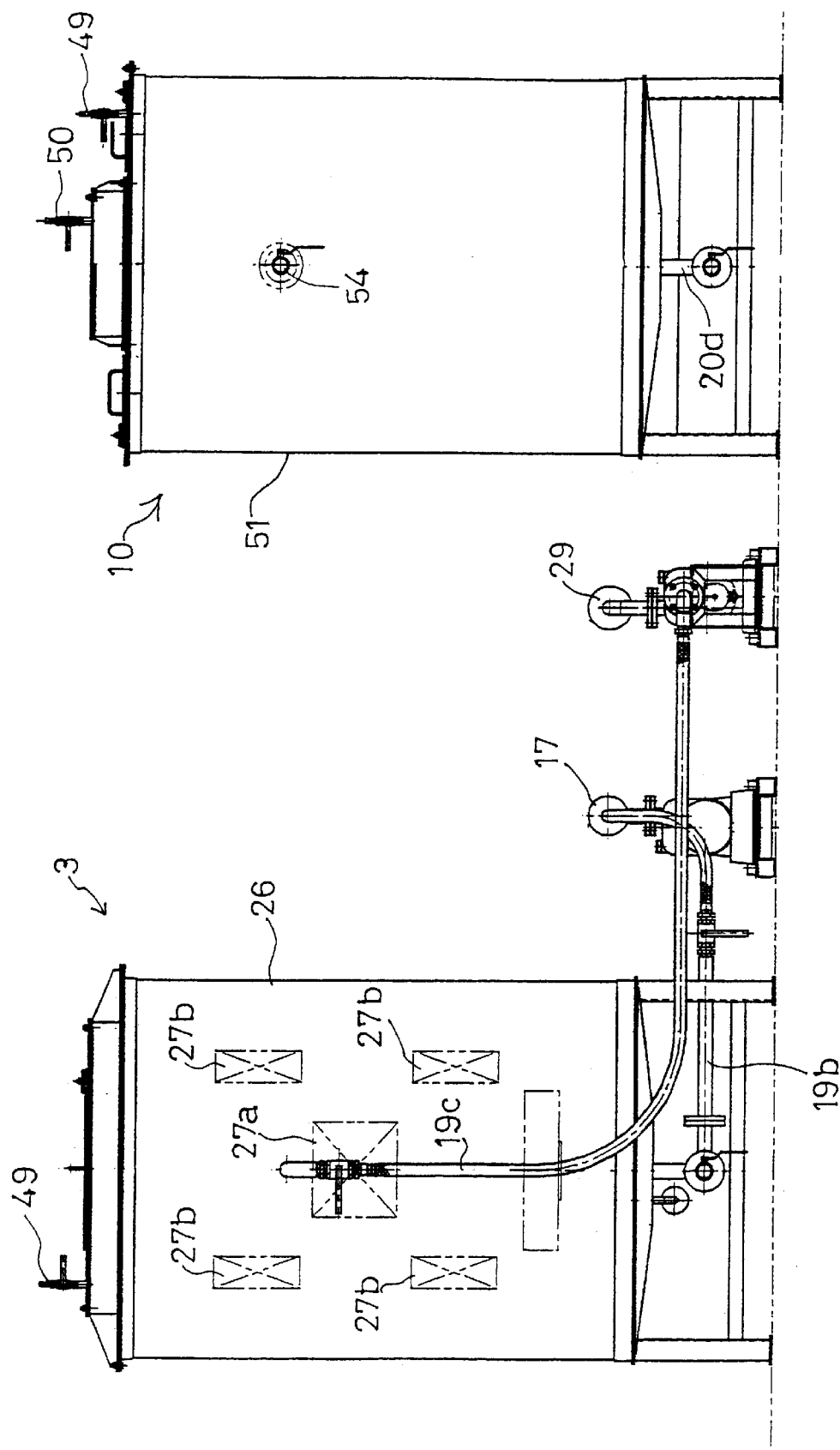
FIG. 4 is a view taken along a line II—II in FIG. 2.

A plurality of first low-frequency range ultrasonic generators 27 are disposed in the first flocculating tank 26 for generating an ultrasonic wave of a low frequency equal to or lower than 100 kHz depending on the concentration of the raw water, as shown in FIGS. 3 and 4. In the first embodiment, the first low-frequency range ultrasonic generator 27 is comprised of a first low-frequency range ultrasonic generator portion 27a for generating an ultrasonic wave having a frequency of 28 kHz or 40 kHz as a lateral wave, and a first low-frequency range ultrasonic generator portion 27b for generating an ultrasonic wave having a frequency of 48 kHz or 100 kHz as a lateral wave. Under a cavitation effect or the like provided by these ultrasonic waves, the ultrasonic wave having the low frequency of 28 kHz or 40 kHz has a role of flocculating the dispersed colloidal particles, and the ultrasonic wave having the low frequency of 48 kHz or 100 kHz has a role of dispersing the flocculated particles and the water molecules. Outputs of the ultrasonic waves provide an energy in a range of 300 W to 1.2 kW.

Permanent magnets 28a of neodymium or the like are laid on an inner surface of the bottom of the first flocculating tank 26, and a second discharge pipe 20b is connected to the bottom of the first flocculating tank 26. Therefore, the flocculates of the colloidal particles in electrically charged states are attracted to the permanent magnets 28a and settled on the bottom. The resulting sediments are transported through the second discharge pipe 20b to the dehydrating means 12.

The water subjected to the first-stage flocculating treatment is transported through a third transporting pipe 19c connected to an upper portion of a side of the first flocculating tank 26 to the disintegrating/electrically charging means 4. A pressurizing pump 29 is disposed in the middle of the third transporting pipe 19c, so that the subject water is allowed to flow under an excessively high pressure into the disintegrating/electrically charging means 4.

An air exhaust port 49 for discharging air contained in the raw water is disposed in the upper portion of the first flocculating tank 26.

The disintegrating/electrically charging means 4 will be described below.

Figure 8:
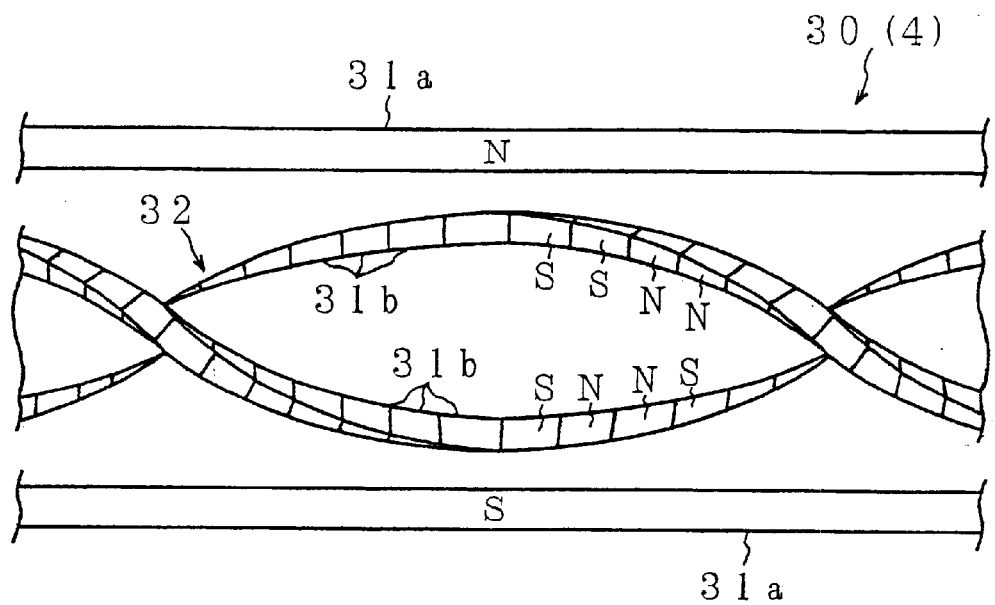
FIG. 8 is a diagram showing essential portions of a disintegrating/electrically charging means in the first embodiment and a second embodiment.

A disintegrating/electrically charging pipe 30 such as a mixing pipe is disposed in the disintegrating/electrically charging means 4 and connected to the third transporting pipe 19c. As shown in FIG. 8, neodymium plates 31a of about 10,000 Gauss are disposed on upper and lower portions of the disintegrating/electrically charging pipe 30, and neodymium element blades 32 each made of a ceramic material and having neodymium elements 31b embedded therein and having a magnetic force of about 11,000 Gauss are disposed within the disintegrating/electrically charging pipe 30. Each of the neodymium element blades 32 is formed from a spirally twisted-flat plate and has the neodymium elements 31b of N and S polarities embedded alternately, for example, in an order of "NNSSNNSS ( ( (" in a widthwise end of the blade 32 in a direction of passage of the subject water, as shown in FIG. 8. Thus, the magnetic field generated by the neodymium plates 31a and the mixing action of the neodymium element blades 32 ensure that the water molecules in the subject water are disintegrated and charged with negative electron (i.e., ionized), and at the same time, the colloidal particles are disintegrated and charged with positive electron and brought into the ordered arrangement. Therefore, in the disintegrating/electrically charging means 4, the finer colloidal particles, which have been completely not removed at the first flocculating/separating stage, can be easily treated at the subsequent second flocculating/separating stage by attracting the molecules having the same potential strongly.

The neodymium plates 31a disposed on the upper and lower portions of the disintegrating/electrically charging pipe 30 may be formed of a magnet.

The second separating means 5 will be described below.

Figure 5:
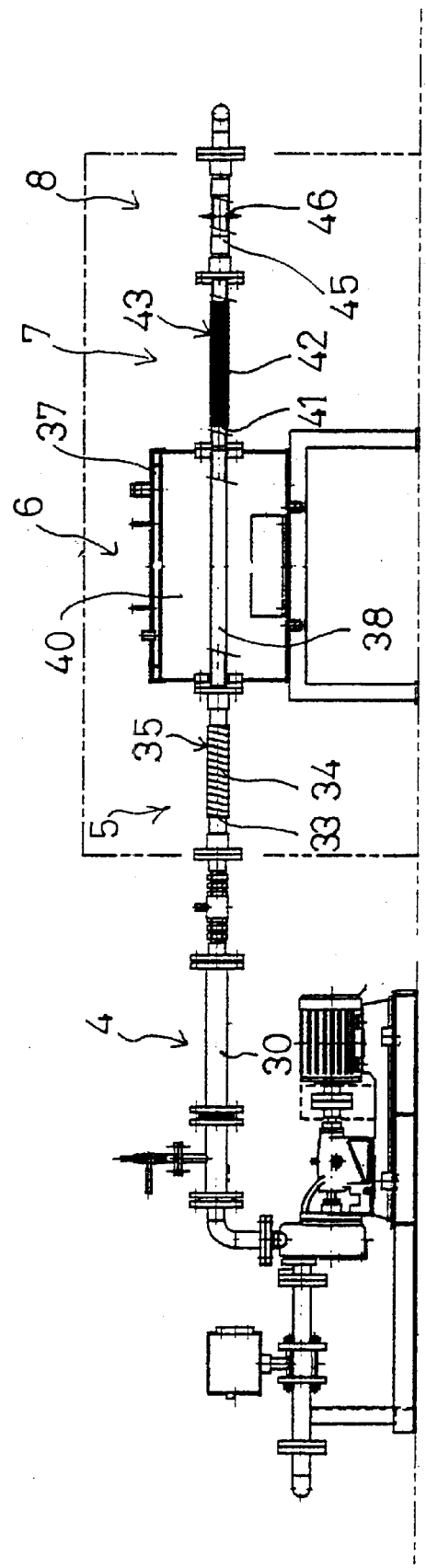
FIG. 5 is a view taken along a line III—III in FIG. 2.

The second separating means 5 has an arrangement substantially similar to that of the first separating means 2. More specifically, a second separating pipe 33 is disposed in the second separating means 5 and connected to the disintegrating/electrically charging pipe 30, as shown in FIGS. 2 and 5. An electromagnetic coil 34 is wound around an outer periphery of the second separating pipe 33, and a second microwave generator 35 is disposed on the outer periphery of the second separating pipe 33. The second microwave generator 35 is formed of a magnet such as a neodymium plate or the like and has an upper portion acting as an N pole and a lower portion acting as an S pole. A microwave having a frequency in a range of 300 M to 16 GHz in accordance with the concentration of incoming water, more preferably, a frequency in a range of 2.4 G to 10.5 GHz from the viewpoint of separating the colloidal particles, and further preferably, a frequency of 10.5 GHz, is generated for about 1 (sec. When such a microwave is emitted to the subject water, the subject water is subjected to the disintegrating treatment, and as a result, fine colloidal particles and water molecules being formed and dispersed sporadically.

Then, the resulting water is transported from the second separating pipe 33 to the deodorizing means 6.

The deodorizing means 6 will be described below.

Figure 9:
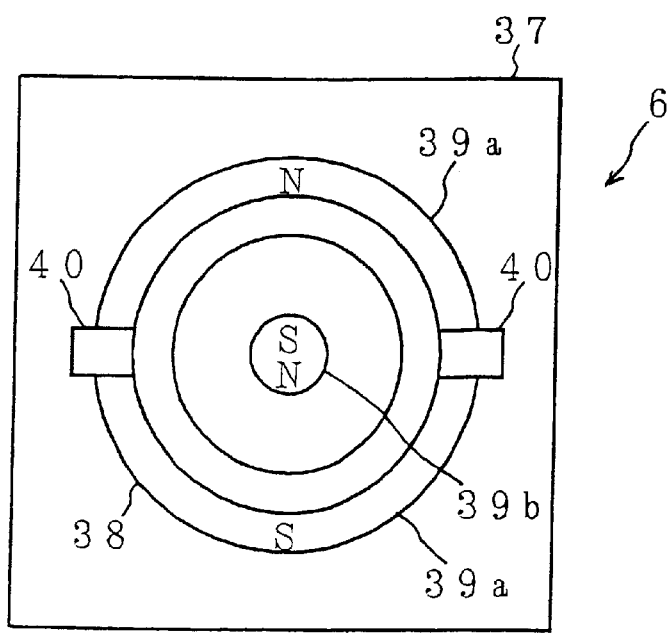
FIG. 9 is a diagram showing essential portions of a deodorizing means in the first and second embodiments.

A deodorizing box 37, which is a high-frequency rage electromagnetic ultrasonic generator, is disposed in the deodorizing means 6. A deodorizing pipe 38 is disposed to extend through the deodorizing box 37 and connected to the second separating pipe 33. External magnets 39a having N and S polarities are disposed at upper and lower locations on the outer side of the deodorizing pipe 38, respectively, as shown in FIG. 9, and a rod-shaped internal magnet 39b is disposed at the axial center position in the deodorizing pipe 38, so that its polarities are opposed to the opposite polarities of the external magnets 39a. In the first embodiment, each of the external magnets 39a comprises an electromagnet, and the internal magnet 39b comprises a permanent magnet. Further, high frequency range ultrasonic wave generators 40 are disposed respectively on left and right sides of the deodorizing pipe 38 for generating a ultrasonic wave as a longitudinal wave having a frequency in a range of 3 M to 300 MHz in accordance with the concentration of the subject water, more preferably, a frequency of 100 MHz at a period of about 0.5 sec.

The subject water is passed through the deodorizing pipe 38, while being mixed or vibrated in the deodorizing pipe 38. In the first embodiment, the subject water is ejected from a nozzle (not shown) disposed within the deodorizing pipe 38, and a vibrating plate (not shown) is disposed in the vicinity of an outlet of the nozzle, so that the subject water is vibrated violently by collision thereof against the vibrating plate.

A composite field comprising a magnetic field and an electric field is formed by the external magnets 39a, the internal magnet 39b and the high frequency range ultrasonic generator 40, thereby generating a so-called electromagnetic ultrasonic wave. This electromagnetic ultrasonic wave acts to fragmentize or decompose the amino acid in the colloidal particles to completely remove an odor from the subject water.

The electromagnetic ultrasonic wave may be emitted even to the disintegrating/electrically charging pipe 30 of the disintegrating/electrically charging means 4 at an output of 1 kW in such a manner to alternately apply an electric field in a magnetic field.

The subject water deodorized in the deodorizing pipe 38 is transported to the second flocculating means 7 acting at the subsequent treating stage.

The second flocculating means 7 will be described below.

A second flocculating pipe 41 is disposed in the second flocculating means 7. An electromagnetic coil 42 is wound around an outer periphery of the second flocculating pipe 41, and a second low frequency range ultrasonic wave generator 43 is disposed on the outer periphery of the second flocculating pipe 41 for generating a ultrasonic wave having a low frequency equal to or lower than 50 kHz in accordance with the concentration of the subject water.

When the ultrasonic waver having the frequency in the low range is emitted to the subject water by the second low frequency range ultrasonic wave generator 43, the water molecules charged at negative ions, of the water molecules and colloidal particles arranged irregularly, are attracted to a wall surface of the second flocculating pipe 41 and flow along the wall surface, and the colloidal particles charged at positive ions flow to the center of the second flocculating pipe 41. Thus, the water molecules and the colloidal particles are dispersed, and the colloidal particles are flocculated together.

The subject water subjected to the second flocculating treatment in the above manner is transported to the subsequent high-voltage pulse treating means 8.

The high-voltage pulse treating means 8 is adapted to generate plasma to remove nitrogen molecules by applying a high voltage of about 10 k to 60 kV at different periods.

Figure 10:
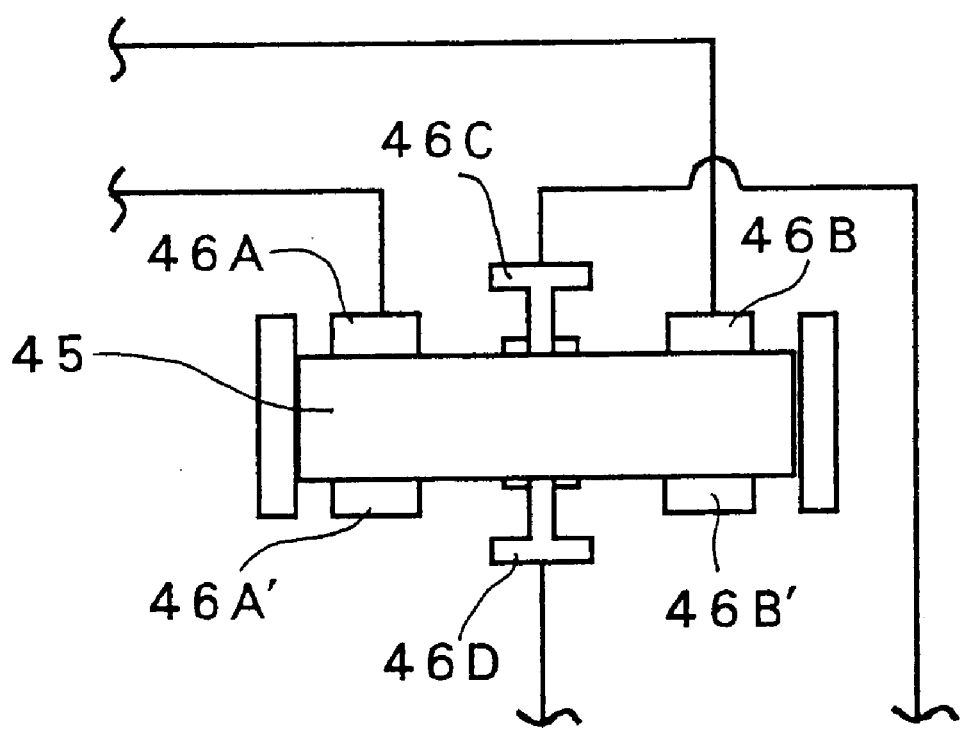
FIG. 10 is an illustration showing a high-voltage pulse treating means of the first embodiment of the liquid treating system according to the present invention.

For this purpose, a high-voltage pulse treating pipe 45 is disposed in the high-voltage pulse treating means 8, so that it is connected to the second flocculating pipe 41, as shown in FIG. 10. A plurality of electrodes 46A, 46A', 46B, 46B', 46C and 46D as high-voltage pulse generators, to which a high voltage is applied at different periods, are disposed in the high-voltage pulse treating pipe 45.

Figure 11:
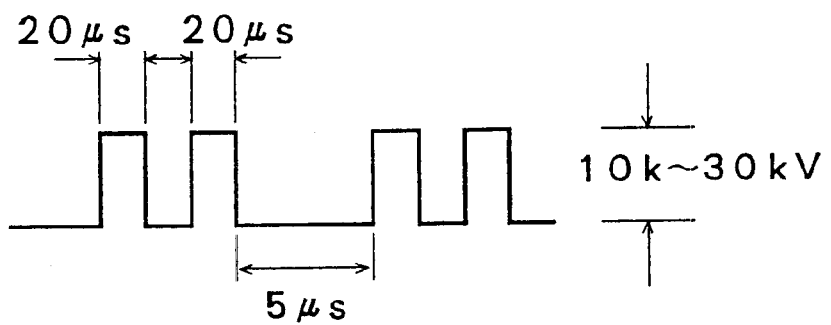
FIG. 11 is an illustration showing a pattern of voltage applied in the high-voltage pulse treating means in the first embodiment.

As shown in FIG. 11, a voltage in a range of 10 k to 30 kV is applied for 20 (sec., and after a lapse of 20 (sec., is applied again for 20 (sec., between the electrodes 46A and 46A' and between the electrodes 46B and 46B'. After a lapse of 5 (sec., a similar pattern of application of voltage is repeated again.

Figure 12:
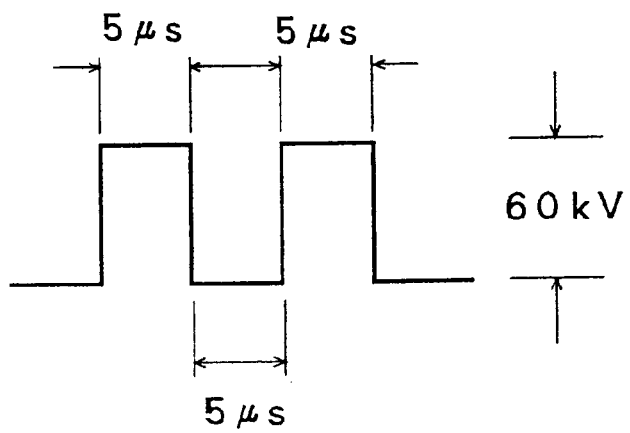
FIG. 12 is an illustration showing another pattern of voltage applied in the high-voltage pulse treating means in the first embodiment.

On the other hand, a voltage of about 60 kV is applied for 5 (sec., at a period of 5 (sec., between the electrodes 46C and 46D, as shown in FIG. 12.

Figure 13:
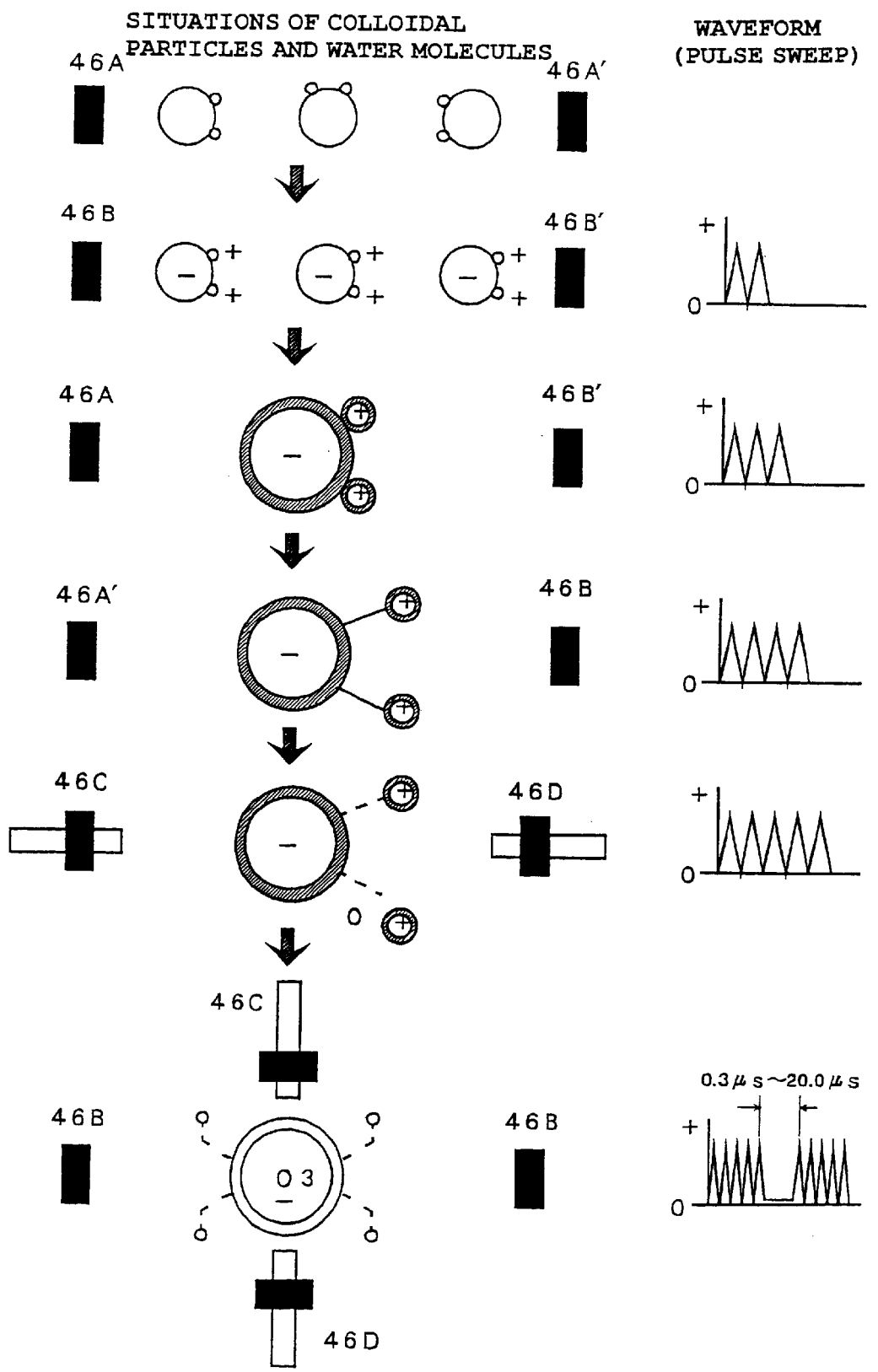
FIG. 13 is an illustration showing states of molecules in a water treated by the high-voltage pulse treating means in the first embodiment.

FIG. 13 shows variations in states of the water molecules and colloidal particles, when the voltages have been applied by the electrodes 46A, 46A', 46B, 46B', 46C and 46D. A large circle shown in FIG. 13 is a water molecule, and a smaller circle bonded to the water molecule is colloidal particles. First, the water molecules are charged at negative electricity, and the nitrogen molecules are charged at positive electricity, by the high-voltage pulses between the electrodes 46A and 46A' and between the electrodes 46B and 46B'. An effect of separating the water molecules and the nitrogen molecules from each other is produced by the high-voltage pulses between the electrodes 46A and 46B' and between the electrodes 46A' and 46B, and the water molecules and the nitrogen molecules are completely forced away from the water molecules by the high-voltage pulse between the electrodes 46C and 46D. Simultaneously with the spattering of the nitrogen molecules, the oxygen molecules which are being treated are bonded to produce ozone. This ozone has an effect of decolorizing and sterilizing the subject water.

Therefore, the nitrogen compounds in the water are removed, and the same time, the subject water can be decolorized and sterilized, by the high-voltage pulse treating means 8.

A fourth transporting pipe 19d is connected to an outlet of the high-voltage pulse treating pipe 45 of the high-voltage pulse treating means 8, so that the subject water is transported to a discharge tank 48 of the flocculate discharging means 9 as a subsequent treating stage.

The flocculate discharging means 9 will be described below.

The flocculate discharging means 9 is adapted to attract the colloidal particles flocculated into flocculates by the second flocculating treatment to discharge them downwards.

Figure 6:
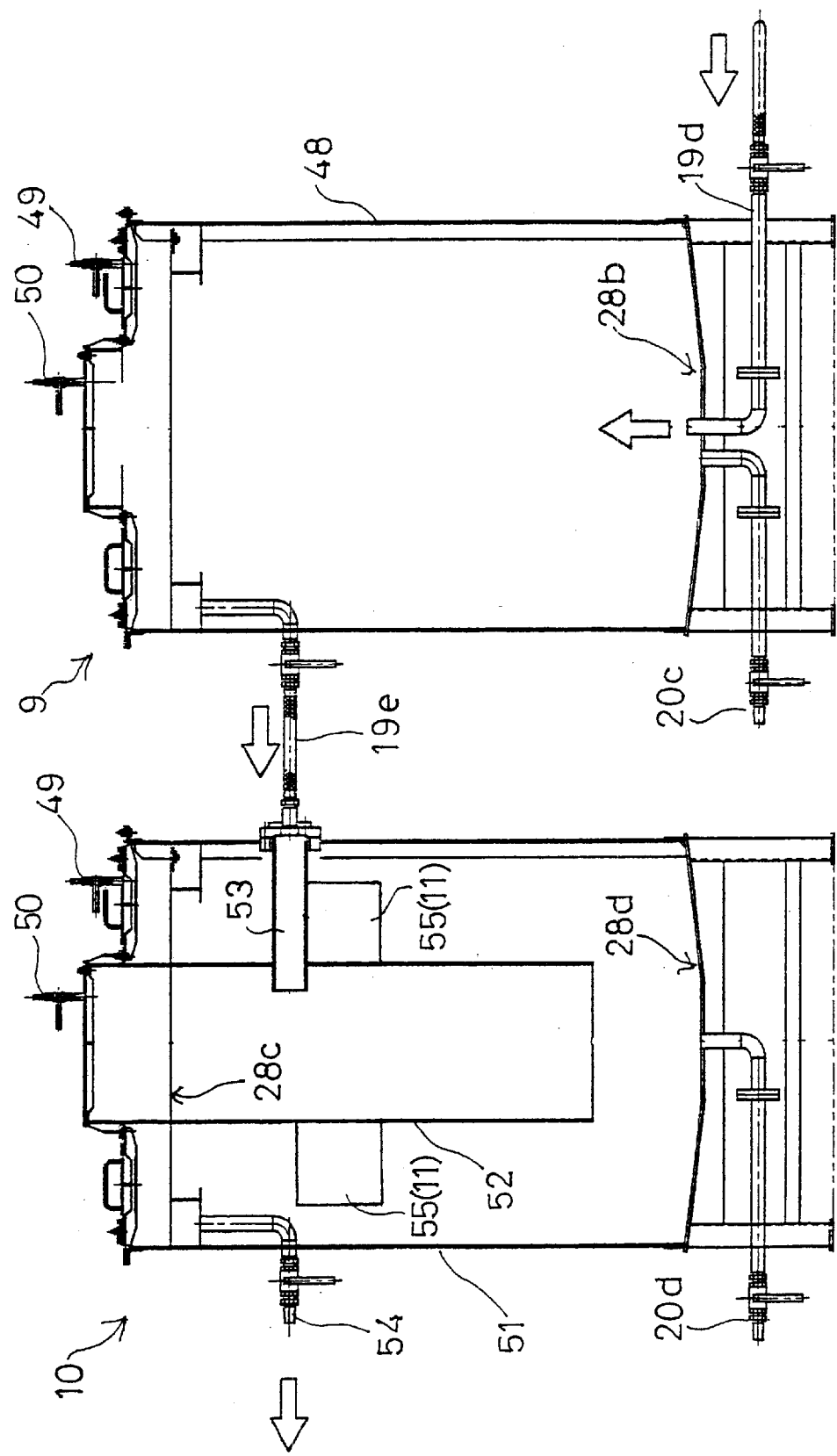
FIG. 6 is a sectional view taken along a line IV—IV in FIG. 2.

The discharge tank 48 for storage of the subject water is disposed in the flocculate discharging means 9, as shown in FIGS. 1, 2 and 6. The fourth transporting pipe 19d is connected to a bottom of the discharge tank 48, so that the subject water containing the flocculates flows into the discharge tank 48, and the permanent magnets 28b of neodymium or the like are laid on the bottom of the discharge tank 48. Thus, the flocculates in the electrically charged states in the subject water flowing through the fourth transporting pipe 19d into the discharge tank 48 are attracted by the magnetic forces of the permanent magnets 28b to become settled down to the bottom.

Then, the sediments collected to the bottom of the discharge tank 48 are discharged through a third discharge pipe 20c connected to the bottom of the discharge tank 48 to the dehydrating means 12.

The magnetic force of each of the permanent magnets 28b is determined in accordance with the concentration of the organic substances in the subject water. When a high-concentration raw water, i.e., a raw water containing a large amount of colloidal particles is to be treated, it is necessary to attract a large amount of flocculates and hence, the magnetic force of the electromagnet is set at a large value. On the other hand, when a low-concentration raw water is to be treated, the magnetic force of the electromagnet is set at a small value.

An air discharge port 49 and an ozone discharge port 50 are disposed at upper portions of the discharge tank 48, so that air and ozone produced from the nitrogen compounds by the high-voltage pulse treatment are discharged to the outside through the air discharge port 49 and the ozone discharge port 50.

Then, the subject water with the flocculates and the like removed therefrom within the discharge tank 48 is transported through a fifth transporting pipe 19e connected to an upper portion of a side of the discharge tank 48 to the water molecule disintegrating means 10.

The water molecule disintegrating means 10 will be described below.

The water molecule disintegrating means 10 is adapted to further disintegrate the water molecules of the water treated by the above-described processing, by the action of an intensive magnetic force, thereby producing an activated water.

For this purpose, as shown in FIGS. 1, 2 and 6, a disintegrating treatment tank 51 is disposed in the water molecule disintegrating means 10, and a tube 62 made of an insulating material such as ceramics is disposed, with its vertical direction being longitudinal, in the disintegrating treatment tank 51. The fifth transporting pipe 19e is connected to an upper portion of a side of the disintegrating treatment tank 51, and an internal transporting pipe 53 is disposed in the disintegrating treatment tank 51 to permit the communication between the fifth transporting pipe 19e and the tube 52. Thus, the water subjected to the water molecule disintegrating treatment is permitted to flow through the fifth transporting pipe 19e and the internal transporting pipe 53 into the tube 52.

The tube 52 has an opened bottom, and an electromagnetic coil (not shown) is wound around an outer peripheral surface of the tube 52. Therefore, when electric current flows across the electromagnetic coil, a downward directed force is generated within the tube 52, whereby the subject water flowing in the tube 52 is fed toward the bottom of the water molecule disintegrating tank 51.

On the other hand, permanent magnets 28c and 28d of neodymium and the like having a magnetic force of about 10,000 Gauss are laid as magnetic field forming members on inner surfaces of top and bottom portions of the water molecule disintegrating tank 51, respectively, so that an intensive magnetic field is formed within the water molecule disintegrating tank 51. Thus, when the subject water is passed through the water molecule disintegrating tank 51, the water molecules, i.e., so-called clusters are disintegrated more finely to produce an activated water.

Therefore, when the water treated in the above manner is utilized as drinking water for an animal or mammal and supplied to a plant, it can exhibit a remarkable effect for the growth thereof.

The subject water after being subjected to the water molecules integrating treatment is discharged, as it is, through a discharge pipe 54 connected to an upper portion of the side of the water molecule disintegrating tank 51, and thus, can be released into a river or the like or utilized as water or the like fed to the animal or the plant.

It should be noted that a fourth discharge pipe 20d is connected to the bottom of the water molecule disintegrating tank 51, so that the final colloidal particles attracted to the permanent magnets 28d laid on the bottom is discharged to the dehydrating means 12.

In addition, the air discharge port 49 and the ozone discharge port 50 for discharging air and ozone produced from the nitrogen compounds or the like and remaining in the subject water are defined in the upper portion of the water molecule disintegrating tank 51.

The oxidizing and reducing means 11 will be described below.

The oxidizing and reducing means 11 comprises four electrode members 55 having a suitable potential, as shown in FIGS. 1, 2 and 6. The subject water ionized by the above-described processing is subjected to an oxidizing and reducing reaction on the surfaces of the electrode members 55 to deliver and receive electrons. The oxidizing and reducing reaction causes the subject water to be restored from the ionized state in which the chemical reaction is liable to occur, to a stable state in which the chemical reaction is difficult to occur.

It should be noted that the oxidizing and reducing reaction is conducted as an electrode reaction through the electrode members 55 in the first embodiment, but as required, suitable oxidizing agent and a reducing agent may be used.

The dehydrating means 12 will be described below.

A dehydrator 56 is disposed in the dehydrating means 12 to remove water contained in the sediments discharged from the above-described means by an action such as a centrifugal separation or the like. The dehydrator 56 is capable of reducing the water content of the sediment from about 98% to about 80%. Therefore, the dehydrated sediment can be treated more effectively in a composting plant.

As described above, the raw water diluting pipe 57 for transporting the water resulting from the dehydration and the washing water discharged from the dehydrator 56 to the raw water tank 16 to dilute the raw water.

On the other hand, the solids resulting from the dehydration conducted by the dehydrator 56 are discharged to the solid receiving section 58. Thereafter, the solids are transported along with the solids filtered off by the filtering means 1 to the composting plant, where they are used as a composting material and subjected to a composting treatment for reuse as an agricultural fertilizer.

The centralized control means 13 will be described below.

Figure 14:
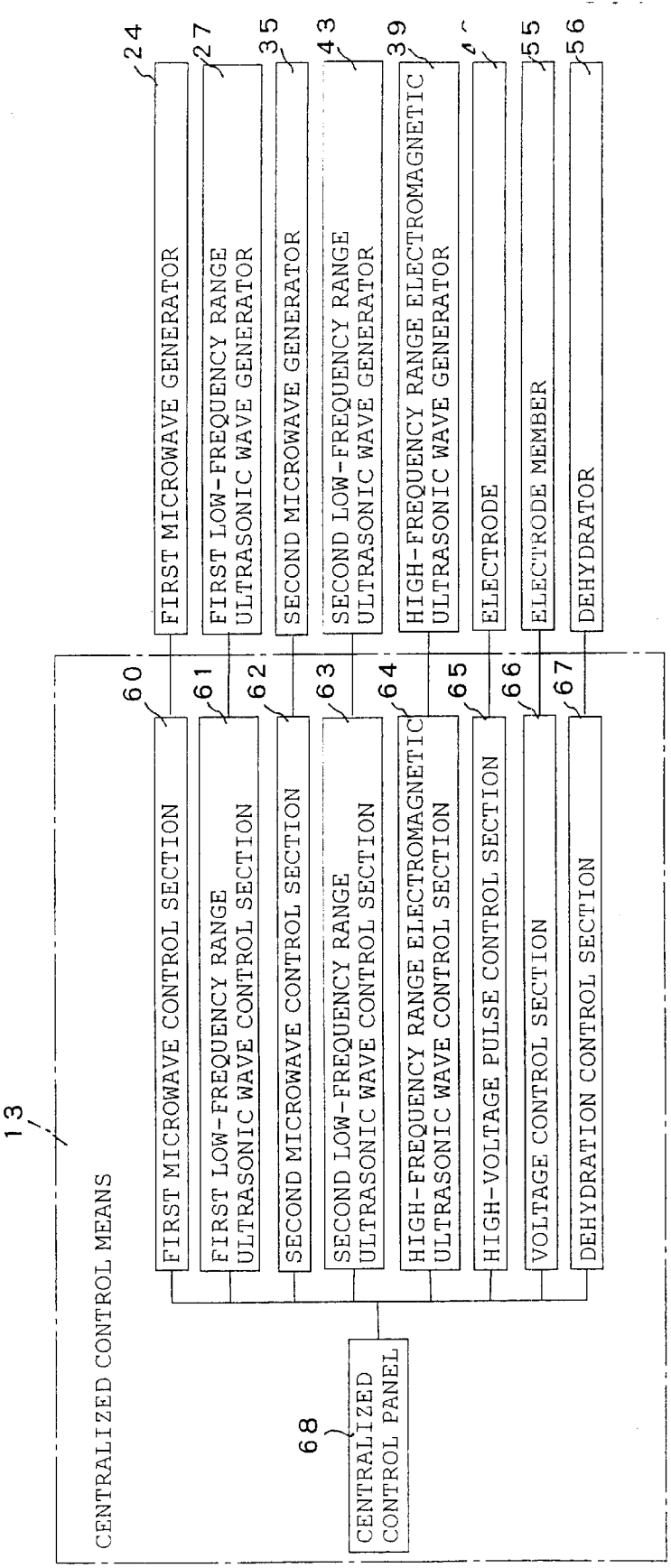
FIG. 14 is a block diagram showing a centralized control means in the first embodiment.

As shown in the block diagram in FIG. 14, the centralized control means 13 includes a first microwave control section 60 for controlling an output of a microwave of 300 M to 16 GHz generated in the first separating means 2, a first low-frequency range ultrasonic wave control section 61 for controlling an output of a ultrasonic wave having a low frequency equal to or lower than 100 kHz and generated in the first flocculating means 3, a second microwave control section 62 for controlling an output of a microwave of 300 M to 16 GHz generated in the second separating means 5, a second low-frequency range ultrasonic wave control section 63 for controlling an output of a ultrasonic wave having a low frequency equal to or lower than 50 kHz and generated in the second flocculating means 7, a high-frequency range electromagnetic wave control section 64 for controlling an output of an electromagnetic ultrasonic wave having a high frequency in a range of 3 M to 300 MHz and generated in the deodorizing means 6, a high-voltage pulse control section 65 for controlling an output of a high-voltage pulse applied in the high-voltage pulse treating means 8, a voltage control section 66 for controlling the voltage applied to the electrode members 55 in the oxidizing and reducing means 11, and a dehydration control section 67 for controlling the operation of the dehydrator 56 in the dehydrating means 12. Each of the control sections is adapted to be controlled easily by the operation of corresponding one of switches (not shown) on a centralized control panel 68, but is controlled automatically in a usual state.

A water treating process carried out in the first embodiment will be described below.

In the water treating process in the first embodiment, first, a raw water including a pig-culture drainage, an industrial drainage and the like is passed through the screen in the filtering means 1, whereby it is filtered to remove colloidal particles suspended in the raw water. The colloidal particles are discharged to the feces-dregs receiving section 15, and the filtered raw water is once stored in the raw water tank 16.

Then, the raw water feeding pump 17 draws the raw water from the raw water tank 16 and feeds it to the first separating pipe 22 of the first separating means 2. The first separating means 2 emits a microwave of 10.5 GHz from the first microwave generator 24 to the raw water to separate the raw water into water molecules and colloidal particles. The subject water subjected to the separating treatment is transported through the second transporting pipe 19b to the first flocculating means 3. The first flocculating means 3 emits a ultrasonic waver having a frequency of any of 28 kHz, 40 kHz and 48 kHz from the first low-frequency range ultrasonic wave generators 27a and 28b to the subject water under the control conducted by the first low-frequency range ultrasonic wave control section 61, thereby flocculating the colloidal particles and dispersing them from the water molecules. Then, the permanent magnets 28a disposed on the bottom surface of the first flocculating tank 26 attracts the flocculated colloidal particles to settle them and discharge them into the second discharge pipe 20b.

On the other hand, the subject water is transported through the third feeding pipe to the disintegrating means 4 under a moderate pressure by the pressurizing pump 29. The disintegrating means 4 disintegrates the water molecules in the raw water under actions of the magnetic force of the neodymium plate 31a and of the mixing by the neodymium element blades 32 to charge the water molecules at negative electricity and at the same time, charge the fine colloidal particles at positive electricity, thereby bringing them into an ordered arrangement.

Then, the water after being subjected to the disintegrating and electrically charging treatment is transported to the second separating means 5. The second separating means 5 emits a microwave of 10.5 Hz from the second microwave generator 35 to the subject water under the control conducted by the second microwave control section 62 of the centralized control means 13, thereby separating the subject water into the water molecules and the colloidal particles. The subject water subjected to the separating treatment is transported to the deodorizing means 6.

The deodorizing means 6 emits an plectromagnetic ultrasonic wave of about 100 MHz from the high-frequency range ultrasonic wave generator 40 in a magnetic field under the control conducted by the high-frequency range electromagnetic ultrasonic wave control section 64 of the centralized control means 13, thereby removing a offensive odor from the subject water by such electromagnetic ultrasonic wave.

The deodorized water is transported to the second flocculating means 7. The second flocculating means 7 emits a ultrasonic wave of 50 kHz or lower from the second low-frequency range ultrasonic wave generator 43 under the control conducted by the second low-frequency range ultrasonic wave control section 63 of the centralized control means 13, thereby flocculating the colloidal particles and dispersing them from the water molecules.

Then, the subject water subjected to the second flocculating treatment is transported to the high-voltage pulse treating means 8. The high-voltage pulse treating means 8 applies voltage of 10 k to 30 kV to between the electrodes 46A and 46A' and between the electrodes 46B and 46B' and at the same time, applies voltage of about 60 kV to between the electrodes 46C and 46D, under the control conducted by the high-voltage pulse control section 65 of the centralized control means 13, thereby generating plasma to separate off the nitrogen compounds contained in the subject water. Ozone generated at that time deodorizes and sterilizes the subject water.

The water with the nitrogen compounds removed therefrom is transported through the fourth transporting pipe 19d to the discharging tank 48 of the flocculate discharging means 9.

In the discharging tank 48, the permanent magnets 28b attract the flocculates of the colloidal particles by their magnetic forces to settle them down to the bottom discharging tank 48 and then, the flocculates are transported through the third discharge pipe 20c to the dehydrating means 12.

The subject water depleted of the flocculates is transported in an order of from the side of a supernatant through the fifth transporting pipe 19e to the water molecule disintegrating tank 51 of the water molecule disintegrating means 10. The water molecule disintegrating means 10 forms an intensive magnetic field by the permanent magnets laid on the top and bottom surfaces of the water molecule disintegrating tank 51, thereby disintegrating the water molecules of the incoming subject water to produce an activated water.

In addition, in the water molecule disintegrating tank 51, the electrode members 55 of the oxidizing and reducing means 11 causes the oxidizing and reducing reaction in the ionized subject water to occur on the surface thereof, thereby restoring the subject water to a stable water.

Thereafter, the water subjected to the disintegrating treatment and the oxidizing and reducing treatment is discharged through the discharge pipe 54, and thus released to a river, or utilized as drinking water for an animal, or as nutritive water provided to a plant.

On the other hand, the sediments of the colloidal particles discharged at each of the treating stages are transported through the first discharge pipe 20a, the second discharge pipe 20b, the third discharge pipe 20c and the fourth discharge pipe 20d to the dehydrator 56 of the dehydrating means 12. In the dehydrator 56, the solids are subjected to the centrifugal separation under the control conducted by the dehydration control section of the centralized control means 13, whereby water is removed from the sediments.

Then, the water removed by the hydrator 56 is transported along with the washing water discharged from the dehydrator 56 through the raw water diluting pipe 57 to the raw water tank 16, where it is utilized to dilute the raw water. On the other hand, the solids resulting from the dehydration are once accommodated in the solid receiving section 58 and then transported to the composting plant, where they are subjected to the composting treatment for utilization as an agricultural fertilizer.

Therefore, according to the first embodiment of the present invention, the colloidal particles (including heavy metals) and the nitrogen compounds contained in the raw water such as a pig-culture drainage and an industrial drainage can be removed reliably and at the same time, the water can be deodorized, decolorized and sterilized by the simple operation using the centralized control means 13, thereby producing an activated and stable water comprising extremely disintegrated water molecules. Thus, the activated water can be released as it is, but also utilized as drinking water for an animal or as water supplied to a plant. If the activated water is used in such an application, it is remarkably effective for the growth of the animal or plant.

In addition, the equipment required for treatment of the water can be reduced in scale and at the same time, the consumed electric powder can be reduced, leading to reductions in initial cost and running cost.

A second embodiment of a liquid treating system according to the present invention will now be described with reference to FIGS. 8, 9 and 15 to 27.

Portions or components in the second embodiment corresponding to those in the first embodiment are designated by like reference characters.

As shown in FIGS. 15 to 20, the liquid treating system of the second embodiment comprises mainly, a suspended solid removing device 71 for removing suspended solids in a water to be treated (which will be referred to as a subject water), a flocculating device 72 for separating colloidal particles of water-soluble organic substances and microorganisms incorporated in the subject water from water molecules to flocculate the colloidal particles and to sterilize, deodorize and decolorize the water, a flocculation accelerating device 73 for accelerating the flocculation of the colloidal particles and promoting the sterilizing and deodorizing treatments and the like, first and second settling devices 74a and 74b for forcibly settling the flocculates remaining in the water to remove them, a thickening device for thickening the flocculates by removing water from the flocculates removed by the flocculating treatment, and a centralized control unit 76 for controlling the treating operations in these devices.

When solid materials having a large weight ratio such as feces and urine are contained in a raw water to be treated, a centrifugal separator or a screen as a pre-treating means may be disposed, as desired, at a location upstream of the suspended solids removing device 71, so that the solid materials having the large weight ratio are centrifugally separated off from the raw water including the feces and urine.

The arrangement and operation of the devices will be described below in detail.

Figure 16:
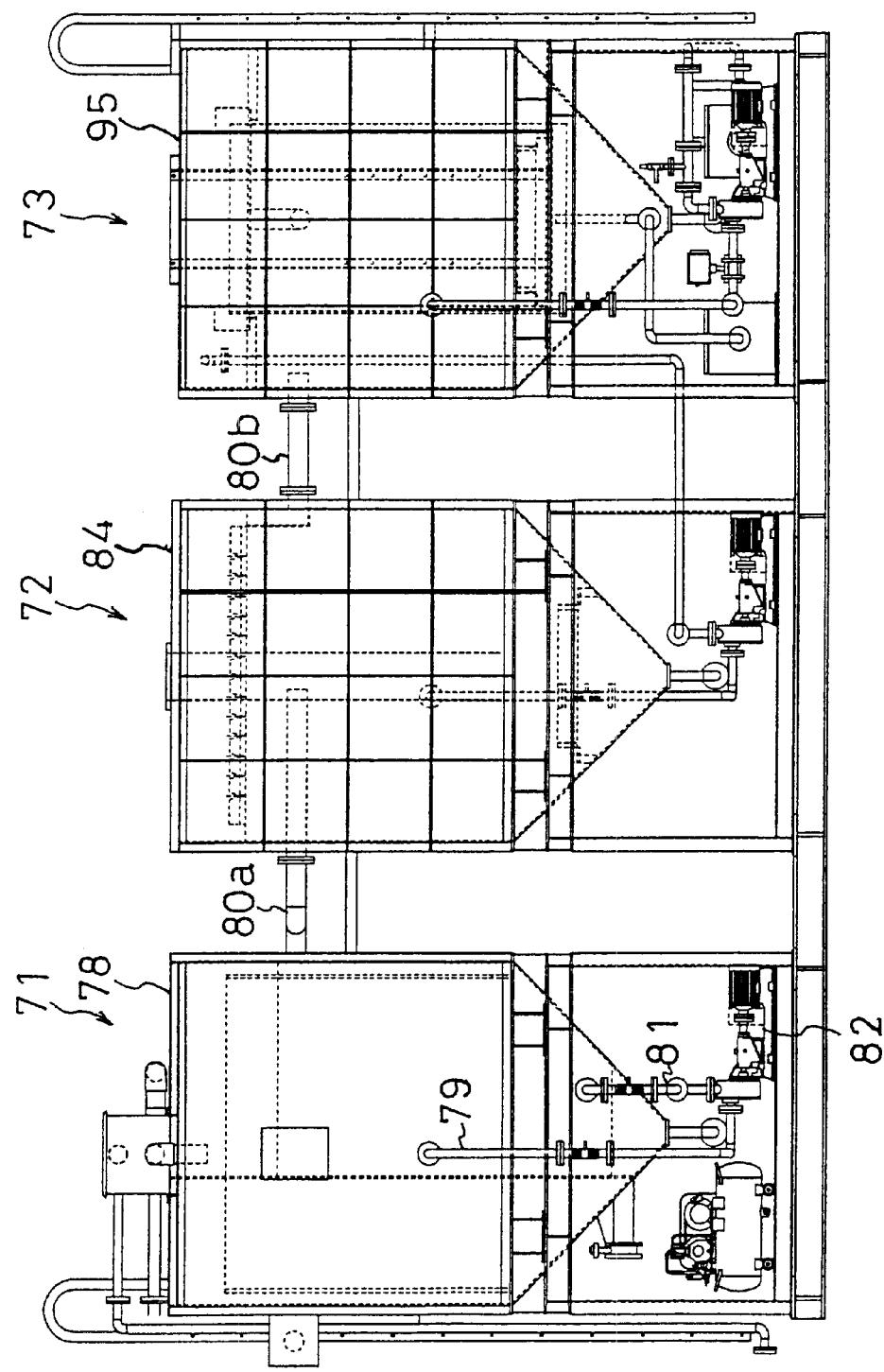
FIG. 16 is a front view showing an essential portions of the second embodiment of the liquid treating system according to the present invention.
Figure 17:
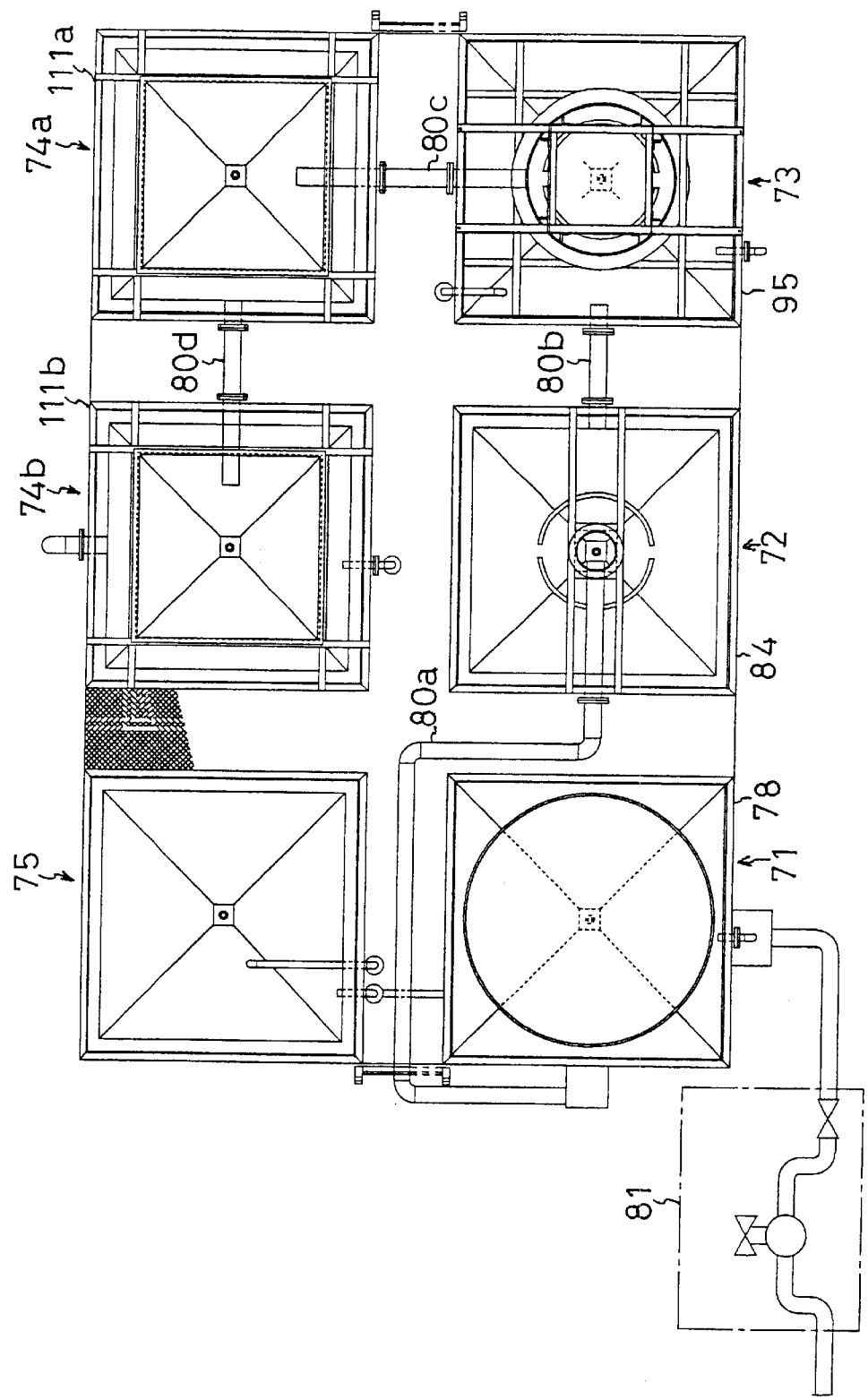
FIG. 17 is a plan view showing the essential portions shown in FIG. 16.
Figure 18:
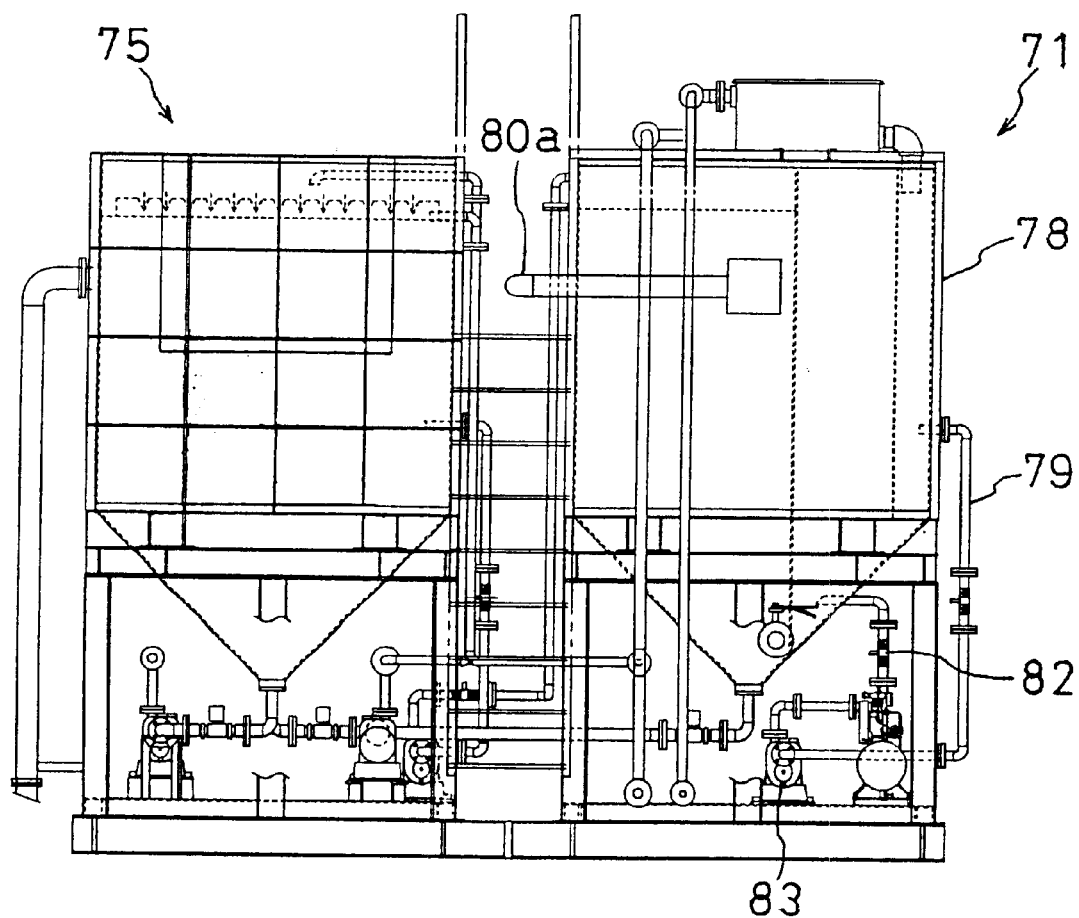
FIG. 18 is a left side view showing the essential portions shown in FIG. 16.
Figure 19:
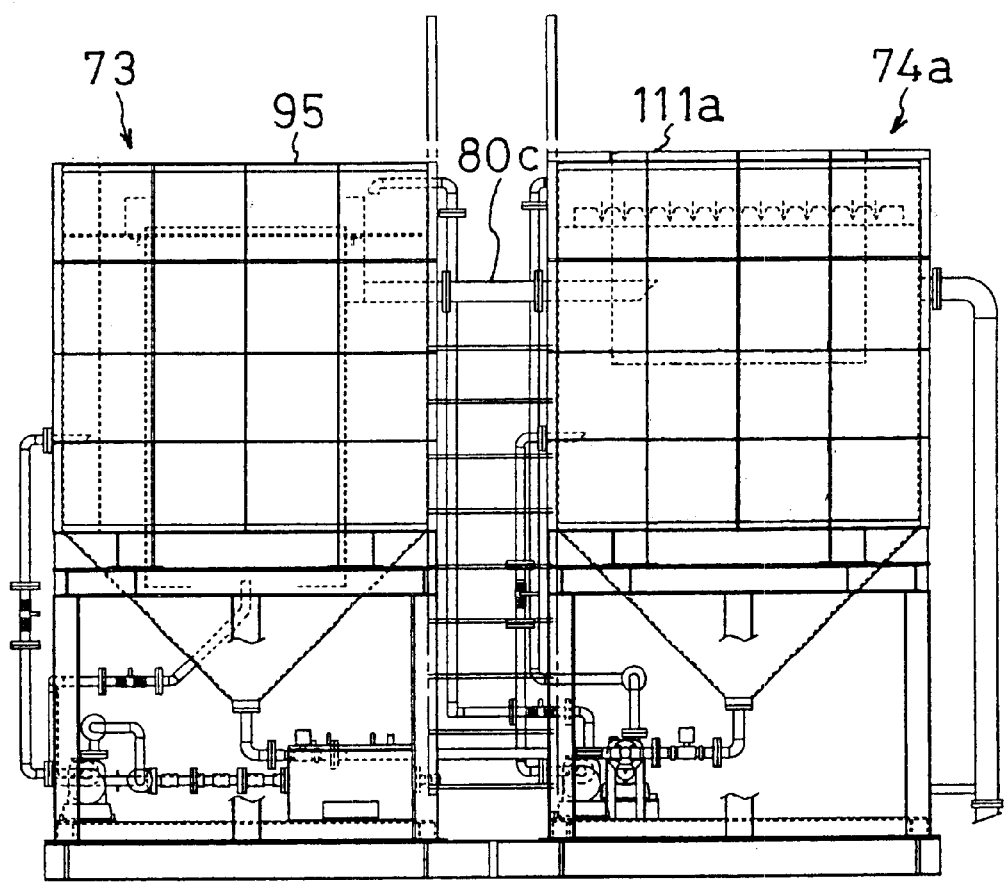
FIG. 19 is a right side view showing the essential portions shown in FIG. 16.
Figure 20:
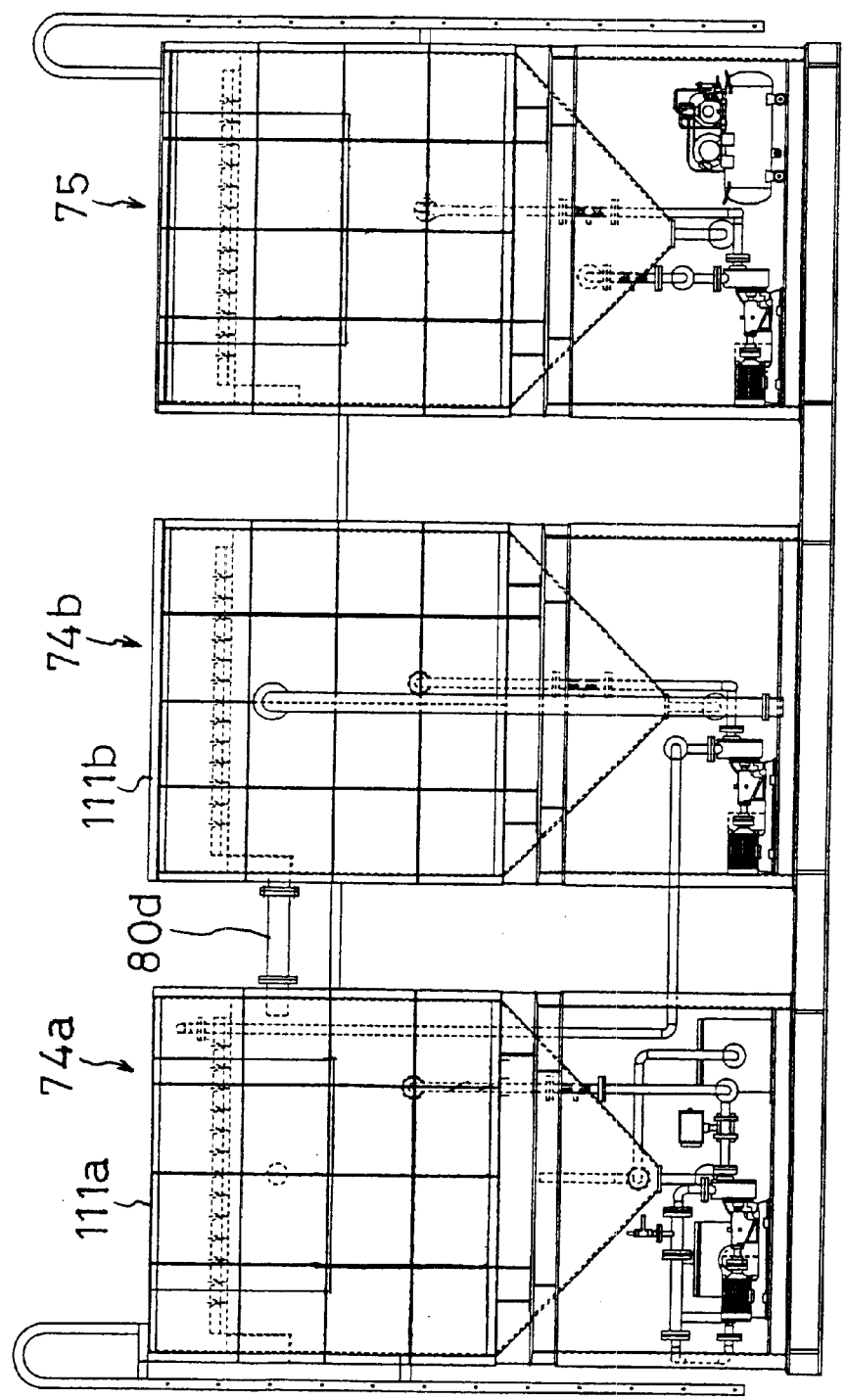
FIG. 20 is a back view showing the essential portions shown in FIG. 16.
Figure 21:
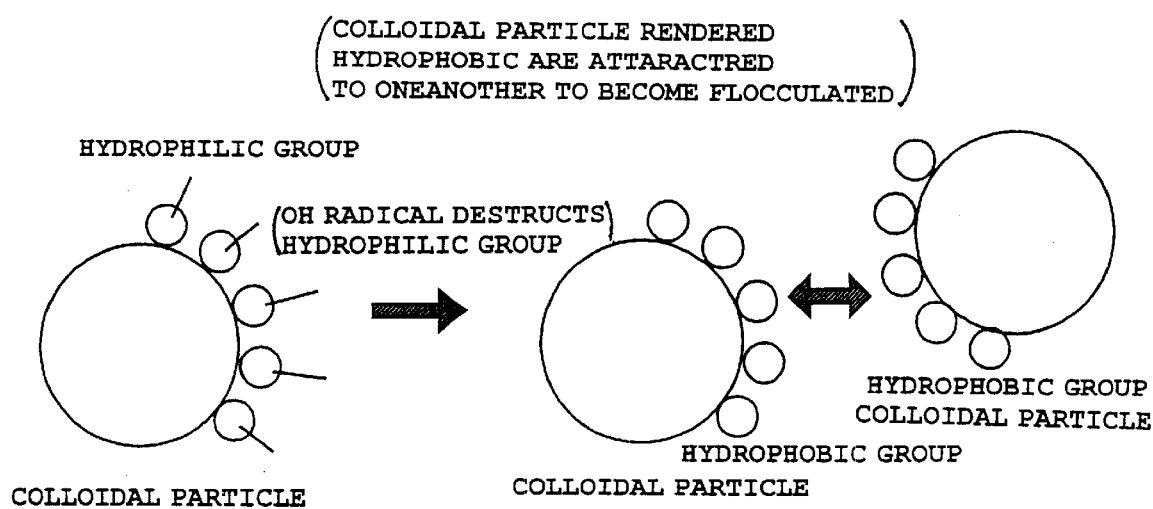
FIG. 21 is an illustration showing a mechanism of separation and flocculation of colloidal particles by a flocculating device and a flocculation accelerating device in the second embodiment.
Figure 22:
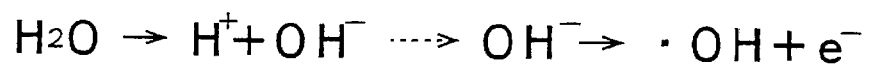
FIG. 22 is a chemical formula showing the generation of OH radical by the treatments in the flocculating device and a flocculation accelerating device in the second embodiment.
Figure 23:
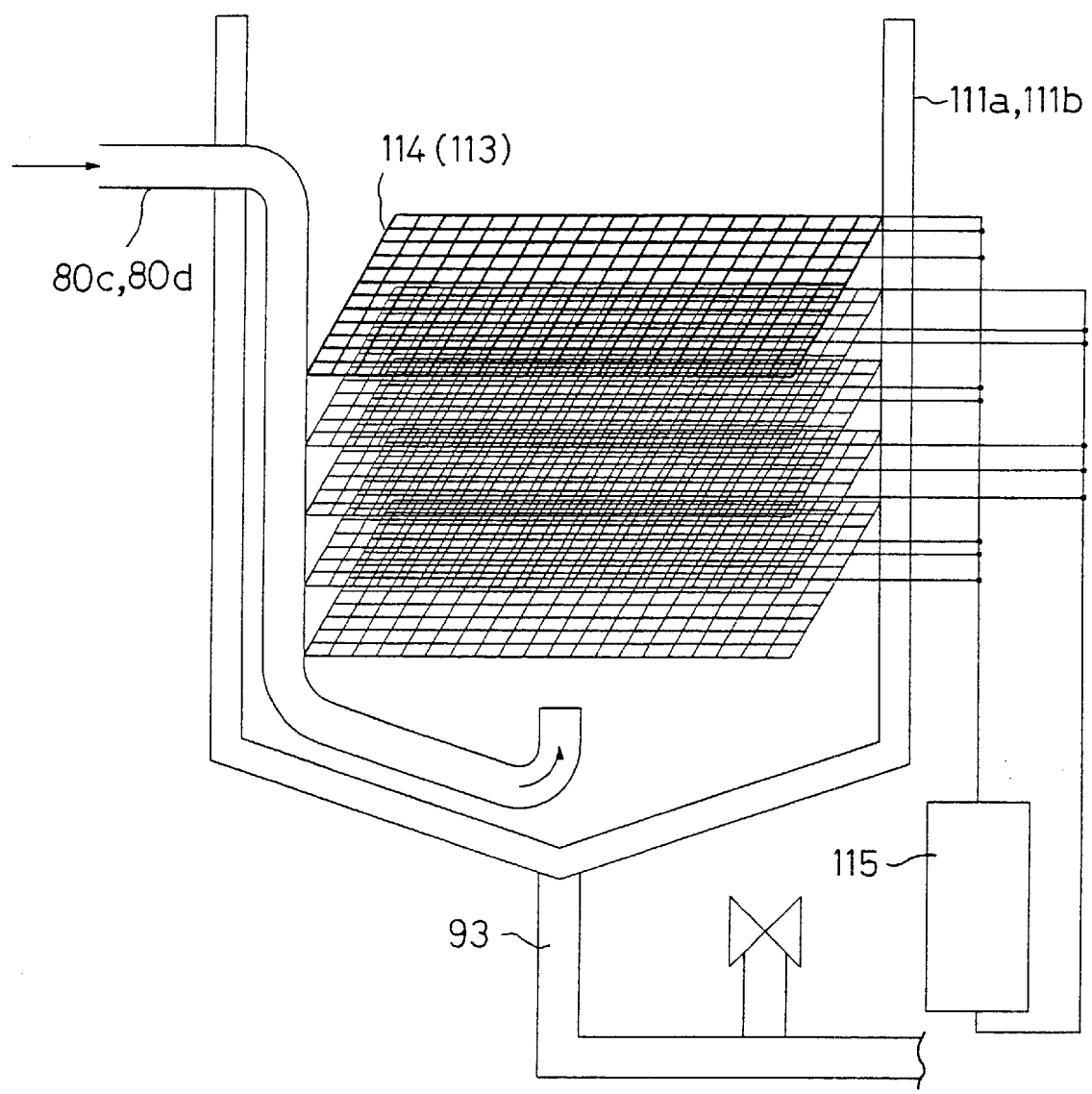
FIG. 23 is an illustration showing essential portions of first and second settling devices in the second embodiment.
Figure 24:
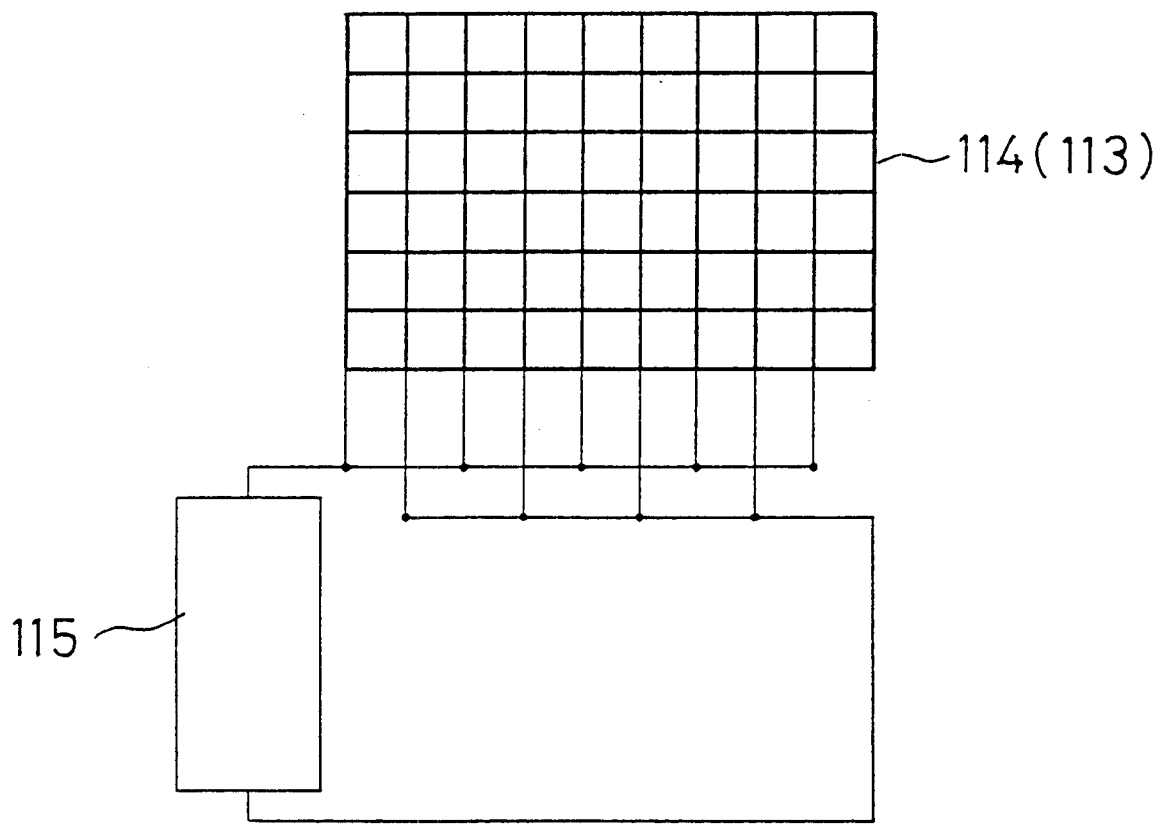
FIG. 24 is an illustration of an electrically separating membrane in the first and second settling devices in the second embodiment.
Figure 25:
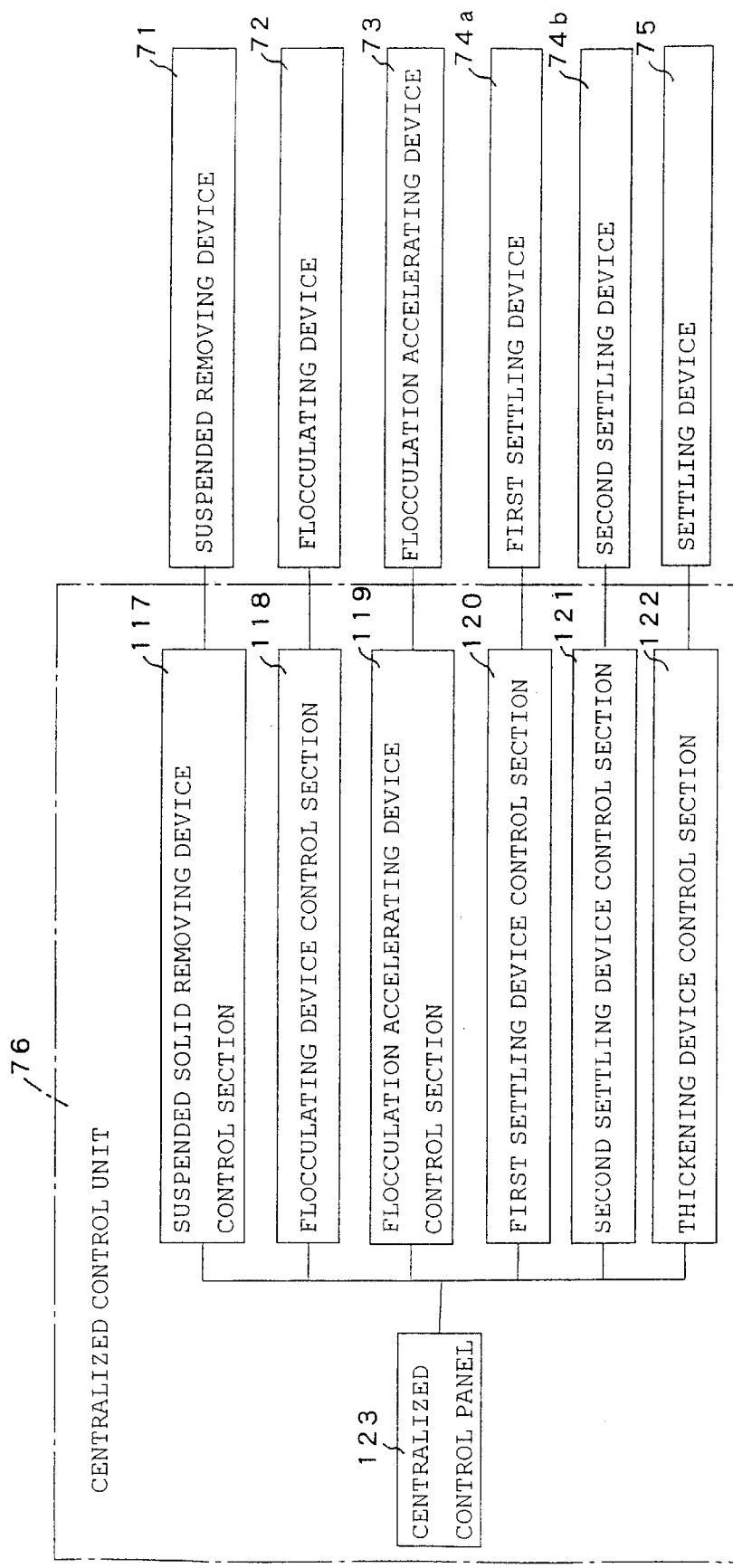
FIG. 25 is a block diagram showing a centralized control unit in the second embodiment.
Figure 28:
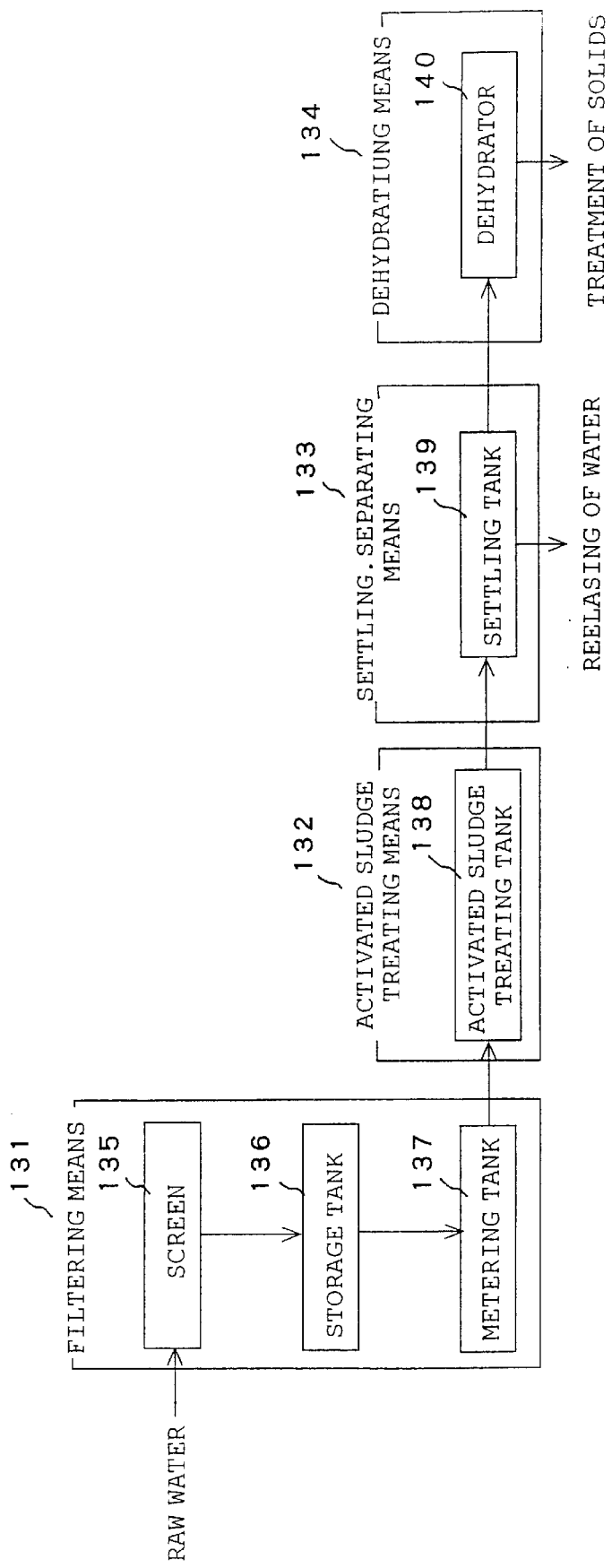
FIG. 28 is a flow diagram showing a prior art water treating system.

A suspended solid removing tank 78 for storage of the raw water depleted of the solid materials is disposed in the suspended solids removing device 71. As shown in FIGS. 16 to 18, a raw water inlet pipe 79 is connected to a front side (as viewed in FIG. 16) of the suspended solid removing tank 78 for permitting the raw water depleted of the solid materials to flow into the suspended solid removing tank 78, and a first transporting pipe 80a is connected to a left side (as viewed in FIG. 17) of the suspended solid removing tank 78 for transporting the water depleted of the suspended solids to a next treatment. A raw water pump 81 is connected to the raw water inlet pipe 79 and serves as a power source for permitting the raw water to flow into the suspended solid removing tank 78. An air intake pipe 82 is connected to a lower portion of the suspended solid removing tank 78, and a plurality of rotating blades (not shown) are disposed at upper locations within the inside of the suspended solid removing tank 78, so that they are rotated eccentrically.

An air compressor 83 is mounted to the air intake pipe 82, so that air of a diameter on the order of several ten (m is drawn from the air compressor 83 through the air intake pipe 82 into the suspended solid removing tank 78, and bubbles produced from this air adsorb the suspended solids in the raw water and rises up to the water surface along with the suspended solids entrained therein. The suspended solids risen up to the water surface are scraped together by the rotating blades; discharged sequentially through a discharge port (not shown), and transported to a composting plant (not shown).

Figure 15:
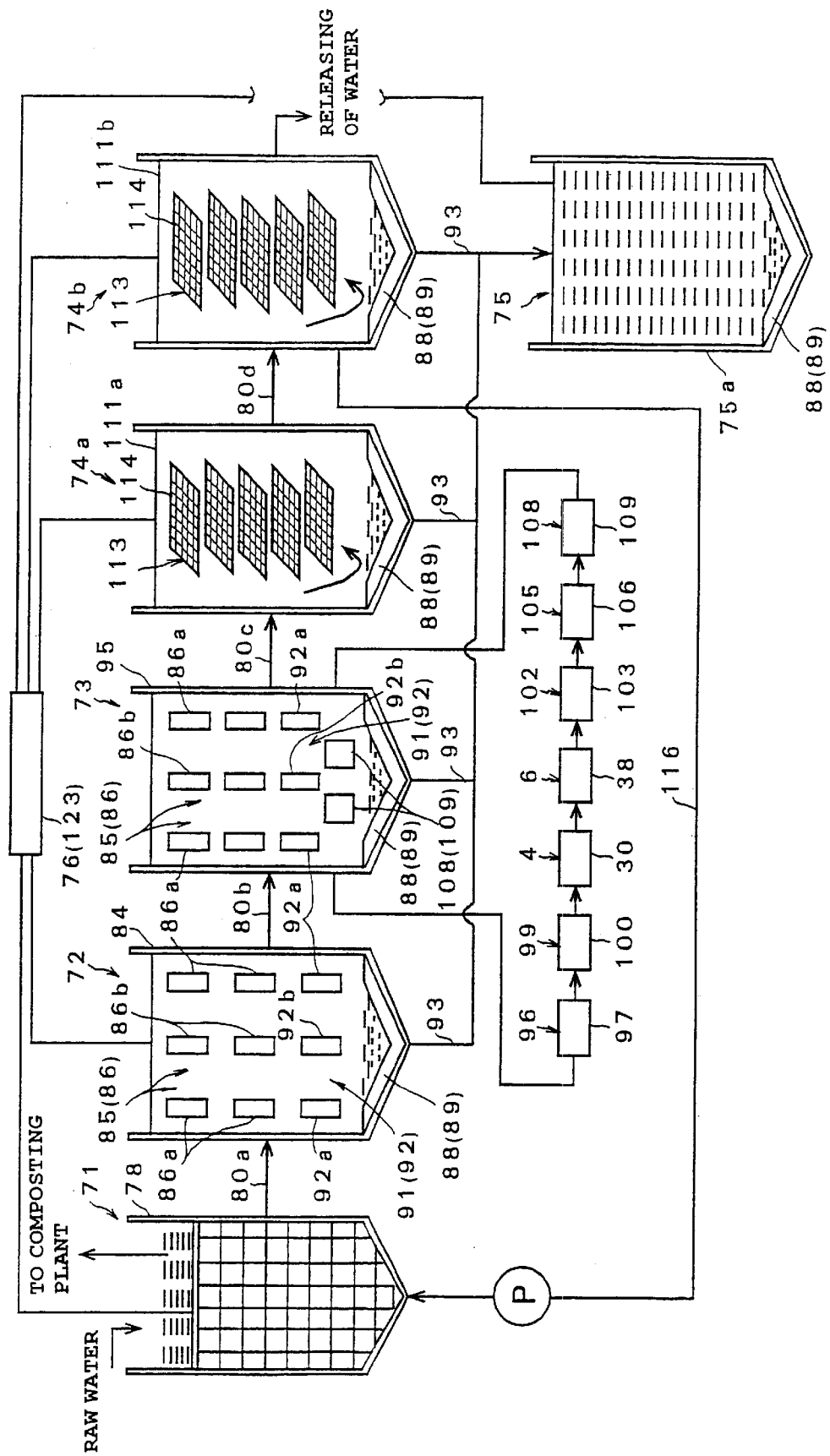
FIG. 15 is a flow diagram showing the second embodiment of a liquid treating system according to the present invention.

A flocculating tank 84 for storage of the water after being subjected to the suspended solids removing treatment is disposed in the flocculating device 72, as shown in FIGS. 15 to 17. AC high-voltage three-electrodes 86 comprising two anodes 86a and a single cathode 86b and constituting an electrically charging/cell destructing means 85 are disposed within the flocculating tank 84, as shown in FIG. 15. The AC high-voltage three-electrodes 86 are usually adapted to apply voltage of 20 kV having a frequency in a range of about 600 k to 1,800 kHz at 8 mA to 100 mA at a predetermined period in a range of about 10 msec to 40 msec in a switched manner, and in the second embodiment, are adapted to apply voltage of 25 to 28 kV having a frequency of 970 kHz at 8 mA to 12 mA and at a predetermined period of about 12 msec. The switching of the voltages applied by the three electrodes at the predetermined period is intended to prevent the wearing of the AC high-voltage electrodes 86 and to widen that area in the flocculating tank 84 which is to be subjected to the electrically charging and cell-destructing treatments.

The application of the high-voltage pulse by the AC high-voltage electrodes 86 is carried out by a glow discharging process or an arc discharging process, and the anodes 86a and the cathode 86b are disposed on the water surface and under the water, respectively, or both under the water to discharge electricity into the water.

Only one set of the AC high-voltage electrodes 86 may be disposed, but a plurality of sets of the AC high-voltage electrodes 86 may be disposed. In the second embodiment, three sets of the AC high-voltage electrodes 86 are disposed, so that a circuit can be switched, as required, to the optimal set of the AC high-voltage electrodes 86 depending on the concentration and the amount and the type of the subject water.

An electric field produced by a high voltage of a high frequency applied to the subject water by the AC high-voltage electrodes 86 electrically charges the colloidal particles of the water-soluble organic substances and microorganisms in the water to flocculate the colloidal particles and further to destruct the water-soluble organic substances and the cells of microorganisms in the water, thereby bringing the microorganisms such as a colon bacillus to the death.

A mechanism for flocculating the colloidal particles of the water-soluble organic substances and the like in the second embodiment will be described below. The term "colloidal particles" means fine particles of water-soluble organic substances dispersed in the liquid, and particles of substance other than liquid molecules, such as microorganisms, fine algae and the like. The colloidal particles are in stable hydrated states or in meta-stable hydrophobic colloidal states in the liquid. Therefore, to separate and remove the colloidal particles of the water-soluble organic substances and the like from the subject water, an energy equal to or larger than a bond energy of hydrophilic groups of water molecules may be applied to the hydrophilic groups, thereby cutting the hydrophilic groups to render the hydrophilic colloid hydrophobic and further, breaking the meta-stable hydrophobic colloidal states to render the colloidal particles hydrophobic, thus flocculating the colloidal particles. For this purpose, in the second embodiment, the hydrophilic groups are cut by OH radicals produced by the anodes 86$a$ by the energy of the high-voltage pulse, as shown by a chemical formula in FIG. 22, and the colloidal particles are electrically charged by an electric field produced by the high-voltage pulse, whereby the meta-stable hydrophobic colloidal states are broken to render the colloidal particles hydrophobic, thereby flocculating the colloidal particles. In addition, the deodorization and the decolorization of the water molecules are achieved by the flocculation and separation of the colloidal particles from the water molecules.

The flocculated colloidal particles are risen along with gases such as nitrogen, carbon dioxide, oxygen, hydrogen generated by the above-described treatment, and settled after diffusion of these gases. For this purpose, permanent magnets 89 of neodymium or the like as a flocculate discharging means 88 are laid on the bottom of the flocculating tank 84, as shown in FIG. 15, so that the flocculates in the electrically charged states are attracted and settled by magnetic forces of the permanent magnets 89.

Thereafter, the sediments collected on the bottom of the flocculating tank 84 are discharged through a discharge pipe 93 connected to the bottom of the flocculating tank 84 to the thickening device 75.

On the other hand, the cells of water bloom and the like and bacteria such as colon bacillus are destructed by the OH radicals produced by the high-voltage pulse to die out.

Further, DC high-voltage electrodes 92 constituting an oxidizing/reducing means 91 and comprising two anodes 92$a$ and a single cathode 92$b$ are disposed within the flocculating tank 84. The DC high-voltage electrodes 92 are adapted to apply DC voltages of about 18 to 55 V and about 80 to 160 V at about 3 to 50 A. In the second embodiment, from the viewpoint of promoting the oxidizing and reducing reaction more effectively, the DC high-voltage electrodes 92 are adapted to apply DC voltages of about 55 V and about 100 V at about 7 to 13 A. From the viewpoint of preventing the wearing of the electrodes and conducting the oxidizing and reducing reaction in a wider region within the flocculating tank 84, the polarities of the anodes 92$a$ and the cathode 92$b$ are switched from each other at a predetermined period.

The application of the DC high voltage ensures that the oxidizing and reducing reaction can be promoted to advance the electrical charging, and the carbon components can bee decomposed, thereby equalizing the dielectric constant.

In the second embodiment, each of the AC high-voltage electrodes 86 and the DC high-voltage electrodes 92 of the flocculating device 72 is formed of graphite. However, the material for such electrodes is not limited to graphite, and for example, each of the cathodes 86$b$ and 92$b$ may be formed of a magnesium-based material such as a lime rod and used as an ion medium electrode. If such an electrode material is used, the delivery and reception of electron can be promoted by about 10 times as compared with the usual case, while suppressing the wearing of the electrodes.

In the second embodiment, when each of the AC high-voltage electrodes 86 is formed from a platinum-titanium alloy material, the weight ratio of platinum to titanium is set at 7:3, taking account of the weight, the manufacture cost and the easy handling. On the other hand, when each of the DC high-voltage electrodes 92 is formed from a copper-tungsten alloy material, the weight ratio of copper to tungsten is set at 7:3 for a similar reason.

A second transporting pipe 80$b$ is connected to a right side (as viewed in FIG. 16) of the flocculating tank 84, so that the subject water after being subjected to the flocculating treatment is transported through the second transporting pipe 80$b$ to the next flocculation accelerating device 73.

The flocculation accelerating device 73 will be described below.

A flocculation accelerating tank 95 for storage of the subject water after being subjected to the flocculating treatment in the flocculating device 72 is disposed in the flocculation r accelerating device 73, as shown in FIGS. 15 to 17 and 19. AC high-voltage electrodes 86 constituting an electrically charging/cell destructing means 85 and DC high-voltage electrodes 92 constituting an oxidizing and reducing means 91 are disposed in the flocculation accelerating tank 95, and each comprise three electrodes as in the above-described flocculating tank 84, so that the separating and flocculating treatment is conducted continuously. Further, various treating means are disposed in the flocculation accelerating tank 95 to separate and flocculate the fine colloidal particles incorporated in the subject water and to deodorize the colloidal particles themselves.

A wave guide 97 constituting a microwave separating means 96 is connected to the flocculation accelerating tank 95 through a transporting pipe (not shown). A microwave which is an electromagnetic wave and has a frequency in a range of 300 M to 16 GHz depending on the concentration of the subject water, more preferably, a frequency in a range of 2.4 G to 10.5 GHz in consideration of the effective separation of the colloidal particles, and further preferably, a frequency of 10.5 GHz, is emitted from the waver guide 97, so that the colloidal particles incorporated in finer forms in the subject water are separated from the water molecules.

A ultrasonic wave box 100 constituting a first ultrasonic wave flocculating means 99 is connected to the wave guide 97 constituting the microwave separating means 96 through a transporting pipe (not shown), and an oscillator (not shown) is disposed in the ultrasonic wave box 100 for oscillating a ultrasonic wave having a frequency in a range of 40 k to 1,200 kHz, more preferably a frequency of 950 kHz, so that the separated colloidal particles in the subject water are flocculated and dispersed from the water molecules by a cavitation effect and the like of the ultrasonic wave emitted from the oscillator.

A disintegrating/electrically charging pipe 30 such as a mixing pipe having an arrangement equivalent to that of the disintegrating/electrically charging means 4 in the first embodiment is connected to the ultrasonic wave box 100 constituting the first ultrasonic wave flocculating means 99. As shown in FIG. 8, neodymium plates 31$a$ are disposed at upper and lower portions of the disintegrating/electrically charging pipe 30, and neodymium element blades 32 each made of a ceramic material and having neodymium elements 31$b$ embedded therein and having a magnetic force of about 11,000 Gauss are disposed within the disintegrating/electrically charging pipe 30. Each of the neodymium element blades 32 is formed from a spirally twisted flat plate and has the neodymium elements 31$b$ of N and S polarities embedded alternately, for example, in an order of "UNNSSNNSS ( ( (" in a widthwise end of the blade 32 in a direction of passage of the subject water, as shown in FIG. 8. Thus, the magnetic field generated by the neodymium plates 31a and the mixing action of the neodymium element blades 32 ensure that the water molecules in the subject water are disintegrated and charged with negative electron (i.e., ionized), and at the same time, the colloidal particles are disintegrated and charged with positive electron and brought into the regularly ordered arrangement. Therefore, in the disintegrating/electrically charging means 4, the molecules having the same potential are attracted strongly to facilitate the separating/flocculating treatment of the finer water-soluble organic substances which have been completely not removed at the separating/flocculating treatment by the microwave. The neodymium plate 31a may be formed of an electromagnet.

In addition, as shown in FIG. 9, a deodorizing pipe 38 constituting the deodorizing means 6 having the same arrangement as in the first embodiment is connected to the disintegrating/electrically charging pipe 30, and a deodorizing box 37 is disposed to surround the outside of the deodorizing pipe 38. External magnets 39a having N and S polarities are disposed at upper and lower locations on the outer side of the deodorizing pipe 38, respectively, and a rod-shaped internal magnet 39b is disposed at the axial center position in the deodorizing pipe 38, so that its polarities are opposed to the opposite polarities of the external magnets 39a. In the second embodiment, each of the external magnets 39a comprises an electromagnet, and the internal magnet 39b is formed of a permanent magnet. Further, high frequency range ultrasonic wave generators 40 are disposed respectively on left and right sides of the deodorizing pipe 38 for generating a ultrasonic wave as a longitudinal wave having a frequency in a range of 3 M to 300 MHz in accordance with the concentration of the subject water, more preferably, a frequency of 100 MHz.

The subject water is passed through the deodorizing pipe 38, while being mixed or vibrated in the deodorizing pipe 38. In the second embodiment, the subject water is ejected from a nozzle (not shown) disposed within the deodorizing pipe 38, and a vibrating plate (not shown) is disposed in the vicinity of an outlet of the nozzle, so that the subject water is vibrated violently by collision thereof against the vibrating plate.

A composite field comprising a magnetic field and an electric field is formed by the external magnets 39a, the internal magnet 39b and the high frequency range ultrasonic generator 40, thereby generating a so-called electromagnetic ultrasonic wave, so that an offensive odor, mainly, an offensive of the colloidal particles themselves is removed from the subjected water by fragmentizing or decomposing the amino acid in the colloidal particles by the electromagnetic ultrasonic wave.

In order to increase the effect provided by such electromagnetic ultrasonic wave, an electric field may be also applied alternately in the magnetic field to the disintegrating/electrically charging pipe 30 of the disintegrating/electrically charging means 4 to generate a ultrasonic wave in a high frequency range at an output of 1 kW.

A high-frequency generating tube 103 constituting a completely separating means 102 is connected to the deodorizing pipe 38 constituting the deodorizing means 6, so that an electromagnetic wave having a frequency in a range of 100M to 500 MHz, more preferably a frequency having a frequency of 270 MHz is applied to generate an induction plasma by a high frequency electric field, thereby optimally resonating the subject water to promote the adsorption of the water-soluble organic substances. The water-soluble organic substances are prevented from being dissolved again in the water molecules, and are separated from the water molecules, by the induction plasma generated by the high-frequency electric field.

Further, a disintegrating pipe 106 constituting a water molecule disintegrating means 105 is connected to the high-frequency generating tube 103 constituting a completely separating means 102. Permanent magnets of neodymium or the like of about 10,000 Gauss are embedded as magnetic field forming members in upper and lower portions of the disintegrating pipe 106, respectively, so that an intensive magnetic field is formed. Thus, when the subject water is passed through the disintegrating pipe 106, clusters of water are more disintegrated by the action of the intensive magnetic field to produce a so-called activated water.

The flocculation accelerating tank 95 is connected to the disintegrating pipe 106 constituting the water molecule disintegrating means 105 through a transporting pipe (not shown), so that the subject water resulting from the above-described treatments is permitted to flow again into the flocculation accelerating tank 95.

In addition to the AC high-voltage electrodes 86 and the DC high-voltage electrodes 92, a plurality of ultrasonic wave generators 109 constituting a second ultrasonic wave flocculating means 108 for generating a ultrasonic wave of 100 kHz or lower are also disposed in the flocculation accelerating tank 95. In the second embodiment, the ultrasonic wave generators 109 are adapted to generate ultrasonic waves as longitudinal waves having frequencies of 28 kHz, 40 kHz and 48 kHz, and a ultrasonic wave as a lateral wave having a frequency of 100 kHz. These ultrasonic waves are used properly depending on the concentration of the subject water, and serve to flocculate the water-soluble organic substances and to disperse the flocculates and the water molecules.

Permanent magnets 89 of neodymium or the like constituting a flocculate discharging means 88 laid on the internal bottom of the flocculation accelerating tank 95, so that the flocculates in electrically charged states in the subject water flowing into the flocculation accelerating tank 95 are attracted and settled down on the bottom by the action of magnetic forces of the permanent magnets 89.

Thereafter, the sediments collected on the bottom of the flocculation accelerating tank 95 are discharged through a discharge pipe 93 connected to the bottom to the thickening device 75.

In the second embodiment, for the manufacturing convenience, the microwave separating means 96, the ultrasonic wave flocculating means, the disintegrating/electrically charging mean, the deodorizing means, the completely separating means 102 and the water molecule disintegrating means 105 are disposed outside the flocculation accelerating tank 95. However, they may be disposed within the flocculation accelerating tank, and even in this case, an equivalent effect can be provided. In the flocculation accelerating tank 95, the subject water is circulated sequentially by a pump or the like, and when a large amount of the subject water is to be treated, the circulating speed is increased, and the subject water is circulated a plurality of times.

The first settling device 74a and the second settling device 74b will be described below.

The first settling device 74a is connected with the flocculation accelerating device 73 through a third transporting pipe 80c, and the second settling device 74b is connected with the first settling device 74a through a fourth transporting pipe 80d. For provision for the treatment of a severely dirty water, the two first and second settling devices 74a and 74b having the same arrangement are disposed in order to more reliably remove dirt such as water-soluble organic substances from the dirty water, but the only one settling devices 74 exhibits a satisfactory effect.

As shown in FIGS. 15, 17, 19, 20, 23 and 24, a first settling tank 111a and a second settling tank 111b for storage of the subject water resulting from the treatment in the flocculation accelerating device 73 are disposed in the first and second settling devices 74a and 74b, respectively. A plurality of lattice-shaped electrically separating membranes 114 constituting a flocculate settling means 113 are disposed vertically in each of the first and second settling tanks 111a and 111b. Each of cells in the lattice of the electrically separating membrane 114 is formed in a side length in a range of about 1 to 5 mm, so that electric current of 5 mA to 30 mA flows across each of the cells by a high-voltage pulse generator 115. The electrically separating membranes 114 are adapted to adsorb the electrically charged flocculates in the subject water flowing from below into the settling tanks 111a and 111b to prevent the upward passage of the flocculates, so that the flocculates are dropped down with the polarities of the electrodes switched over when the flocculates are discharged.

Permanent magnets 89 of neodymium or the like are laid on the bottom of each of the first and second settling tanks 111a and 111b, so that the forcibly settled and electrically charged flocculates are reliably attracted and discharged through the discharge pipe 93 into the composting plant.

A diluting transporting pipe 116 is connected to the second settling tank 111b and communicates with the suspended solid removing tank 78, as shown in FIG. 15, so that a portion of the subject water treated in the second embodiment flows into the suspended solid removing tank 78. The thus-treated water is called a so-called activated water with the water molecules being in electrically charged states. Therefore, this activated water has a nature that if it is incorporated into the raw water, it causes oxidizing/reducing reaction to decompose the dirt. In the second embodiment, the subject water resulting from the treatment in the second settling device 74b is introduced into the suspended solid removing tank 78, but the water molecules of the subject water immediately after being treated in the flocculating device 72 are more electrically charged, so that the decomposition of the dirt by the oxidizing/reducing reaction can be promoted effectively. Therefore, for example, if water in a river treated in the flocculating device 72 is previously incorporated into the raw water and subjected to a primary treatment, it is possible to simplify the subsequent treatments to enhance the treating ability.

The thickening device 75 will be described below

A thickening tank 75a is disposed in the thickening device 75 and connected to the each of the above-described tanks by the discharge pipes 93, as shown in FIG. 15. The thickening tank 75a is adapted to recover the flocculates produced by the treatment in each of the tanks and to remove water from the flocculates to facilitate the composting treatment in the composting plant. A known means such as a dehydrator or the like may be used to remove the water from the flocculates.

The centralized control unit 76 will be described below.

The centralized control unit 76 includes a suspended solid removing device control section 117 for controlling the blowing of air in the suspended solid removing device 71 and the rotation of the blades, a flocculating device control section 118 for controlling the magnitude, the frequency and the like of the voltage applied by each of the AC high-voltage electrodes 86 and the DC high-voltage electrodes 92 in the flocculating device 72, a flocculation accelerating device control section 119 for controlling the magnitude and the like the voltage applied by each of the AC high-voltage electrodes 86 and the DC high-voltage electrodes 92 in the flocculating device 72, controlling the output of the microwave having a frequency in a range of 300 M to 16 GHz generated in the microwave separating means 96, controlling the output of the ultrasonic wave having a frequency in a range of 40 k to 1,200 kHz generated in the first ultrasonic wave flocculating means 99, controlling the output of the ultrasonic wave having a frequency in a range of 3 M to 300 MHz generated in the deodorizing means, controlling the output of the electromagnetic wave having a high frequency in a range of 100 M to 500 MHz generated in the completely separating means 102, the outputs of the ultrasonic waves having frequencies of 28 kHz, 40 kHz, 48 kHz and 100 kHz generated in the second ultrasonic wave flocculating means 108 and controlling the speed of circulation of the subject water, a first settling device control section 120 and a second settling device control section 121 for controlling the application, the switching-over and the like of the voltages of 1- to 60 kV in the first and second settling devices 74a and 74b, and a thickening device control section 122 for controlling the dehydration in the thickening device 75. Each of the control sections can be operated easily by corresponding one of switches (not shown) on a centralized control panel 123, and usually controlled automatically.

Results of a demonstrating test on the treatment of a raw water using the second embodiment will be described below with reference to FIGS. 26 and 27.

A drainage containing feces and urine of pig was used as a raw water and measured for the bio-chemical demand of oxygen BOD (mg/l), the chemical demand of oxygen COD (mg/l), the mass of suspended solids SS (mg/l), the nitrogen content T-N (mg/l), a phosphorus content T-N (mg/l), the number of colon bacillus (number/cm3), the hydrogen ion concentration (pH), the evaporation residue (TSS) and the oxidizing/reducing potential (ORP) at a sampling site, i.e., at a site before removal of the solid materials, at an outlet of the suspended solid removing device 71, at an outlet of the flocculating device 72, at an outlet of the flocculation accelerating device 73, at an outlet of the first settling device 74a and at an outlet of the second settling device 74b for discharging the water as a released water. The measurement was carried out five times on different days. The bio-chemical demand of oxygen (BOD), the chemical demand of oxygen (CODMn) and the mass of suspended solids (SS) were measured as an organic substance content.

The hydrogen ion concentration was measured by a glass electrode process; the bio-chemical demand of oxygen (BOD) was measured by a diaphragm electrode process; the chemical demand of. oxygen (COD) was measured by a titrating process; the mass of suspended solids (SS) was measured by a filtration gravimetric process; and the number of colon bacillus was measured by a deoxycolate culture medium process. The nitrogen content was measured by a calcium peroxy disulfate decomposing process; the evaporation residue was measured by a sewage test process; and the oxidizing/reducing potential was measured by a sanitary test process.

The results of the synthesis carried out under the above-described conditions are shown in FIGS. 26 and 27.

(1) Organic Substance Content

It was observed that BOD in the raw water was in a range of 7,800 to 27,000 mg/l; COD was in a range of 1,800 to 13,000 mg/l; and SS was in a range of 1,700 to 25,000 mg/l, but at the outlet of the suspended solid removing device 71 after the pre-treating step, BOD was in a range of 5,300 to 10,000 mg/l; COD was in a range of 1,500 to 2,900 mg/l; and SS was in a range of 720 to 3,200 mg/l. Thus, BOD was decreased by about 60%; COD was decreased by about 80%; and SS was decreased by about 90%. Therefore, it can be seen that the pre-treatment was carried out effectively. However, the treated water provided in the electrically charged state after processing in the liquid treating system of the second embodiment was incorporated in the raw water and hence, it is necessary to take the effect provided by the treated water into consideration.

In the water from the outlet of the second settling device 74*n*, i.e., the released water, BOD was in a range of 2.7 to 31 mg/l; COD was in a range of 1.8 to 30 mg/l; and SS was in a range of 1.7 to 40 mg/l.

Consequently, the rate of decrease in BOD is 99.9% at the maximum and 99.7% at the minimum and thus, there is a tendency that when the concentration at the outlet of the suspended solid removing device 71 (at an inlet of the flocculating device 72) is lower, a higher rate of decrease in BOD is shown. The rate of decrease in COD is 99.9% at the maximum and 98.3% at the minimum. An interrelation between the concentration of the incoming water and the concentrate of the treated water is not observed from the data of COD. The rate of decrease in SS is 99.9% at the maximum and 97.7% at the minimum, and an interrelation between the concentration of the incoming water and the concentrate of the treated water is not observed from the data of SS, as in COD.

(2) Nitrogen Content

The nitrogen content in the raw water was in a range of 1,900 to 3,100 mg/l but at the outlet of the suspended solid removing device 71 after the pretreatment, the nitrogen content was in a range of 1,100 to 1,600 mg/l and thus, about of 42.1 to 63.6% of nitrogen was removed. Therefore, it can be seen that the pretreatment was carried out effectively.

At the outlet of the second settling device 74*b*, the nitrogen content is in a range of 7.9 to 14 mg/l, and the rate of removal of nitrogen is about 99.7%. Therefore, it can be seen that when the nitrogen content in the raw water is equal to or higher than 4,000 mg/l, the rate of removal is 99.7%, and is little influenced by the frequency in service of the system and the variation in load.

(3) Phosphorus Content

In the raw water, the phosphorus content is in a range of 400 to 690 mg/l, but at the outlet of the suspended solid removing device 71, the phosphorus content is in a range of 97 to 200 mg/l and thus, about 58.3 to 85.9% of the phosphorus was removed. However, it is difficult to consider that phosphorus is removed in the suspended solid removing device 71, and it is considered that there was an effect of dilution by the water resulting from the processing in the liquid treating system of the second embodiment.

At the outlet of the second settling device 74*b* after the processing of the water in the liquid treating system of the second embodiment, the phosphorus content was in a range of 0.068 to 1.3 mg/l and thus, the rate of removal of phosphorus was at about 99.9% at the maximum and 99.7% at the minimum. Even with respect to the rate of removal of phosphorus, an interrelation between the concentration of the incoming water and the concentrate of the treated water was not observed.

(4) Number of Colon Bacillus

In the raw water, the number of colon bacillus was in a range of 240,000 to 900,000/cm$^3$, but the number of colon bacillus was in a range of 160,000 to 250,000/cm$^3$ at the outlet of the suspended solid removing device 71, and reached 0/cm$^3$ at the outlet of the second settling device 74*b*. Therefore, it was observed that approximately 100% of the colon bacillus could be removed by the liquid treating system of the second embodiment, irrespective of the number of the colon bacillus in the raw water.

(5) Results of Analysis of Other Values

The hydrogen ion concentration in the raw water showed an acidic value of 6.5, but the released water resulting from the processing showed an alkaline value of 7.4. The oxidizing/reducing potential was −290 mV in the raw water, but 180 mV in the released water. The evaporation residue (TSS) was 19,000 mg/l in the raw water, but was decreased to 330 mg/l in the released water. The odor was removed by 90% or more at the time point when the water flowed from the suspended solid removing device 71 into the flocculating device 72. Solids risen to the water surface was deodorized into an almost odorless state by the high-voltage decomposing effect in the flocculating device 72 and then deodorized by 99% by the flocculation accelerating device 73.

Therefore, according to the second embodiment of the present invention, it is possible to flocculate and sterilize the water-soluble organic substances and microorganisms contained in a raw water by the simple operation using the centralized control unit 76 to remove them rapidly and reliably, and to achieve the deodorization and decolorization by such treatment, and further to produce a stable water which is an activated water comprising extremely disintegrated water molecules. Therefore, the activated water can be released as it is, but also can be utilized as drinking water for an animal and as water supplied to a plant. If the activated water is used in such application, it can exhibit a remarkable effect for the growth of the animal and plant.

In addition, the equipment required for the treatment of the water can be reduced in scale or size, and the consumed electric power can be reduced, leading to reductions in initial cost and running cost.

Although the embodiments of the present invention have been described in detail, it will be understood that the present invention is not limited to the above-described embodiments, and various modifications in design may be made without departing from the spirit and scope of the invention defined in claims.

For example, the separating/flocculating means for the subject water in the first embodiment of the present invention is divided into the first separating means 2 and the first flocculating means 3, and the second separating means 5 and the second flocculating means 7, whereby two runs of the separating and flocculating treatment are carried out. However, when a water to be treated and having a low concentration of organic substances is to be purified, the first separating means 2 and the first flocculating means 3 and the second separating means 5 and the second flocculating means 7 may be brought together into a single unit to carry out one run of the separating and flocculating treatment. On the other hand, when a water to be treated and having a high concentration of organic substances is to be purified, the number of division of the separating/flocculating means may be increased.

The AC and DC high-voltage electrodes 86 and 92 in the flocculating device 72 and the flocculation accelerating device 73 in the second embodiment of the present invention are disposed in the single tank, respectively, but may be disposed in separate tanks.

Further, the first and second embodiments of the present invention have been described with respect to the treating means constituting the water treating system. However, the treating means have been used as the water treating system, but may be used as individual treating devices. Even if each of the treating means is used as an individual device, an effect can be exhibited in each of the treatments.

What is claimed is:

1. A liquid treating process comprising the steps of emitting an electromagnetic wave to a liquid containing colloidal particles of water-soluble organic substances and microorganisms to separate said liquid into the colloidal particles and liquid molecules, emitting an ultrasonic wave to the liquid resulting from the separation to flocculate said colloidal particles, emitting an electromagnetic ultrasonic wave at a higher frequency than said ultrasonic wave to said liquid to deodorize said liquid, and separating the flocculated colloidal particles from the liquid by allowing the flocculated colloidal particles to settle.

2. A liquid treating process according to claim 1, wherein the ultrasonic wave has a frequency equal to or lower than 100 kHz, and the electromagnetic ultrasonic wave has a frequency in a range of 3 to 300 MHz.

3. A liquid treating process according to claim 1 or 2, wherein the electromagnetic wave is a microwave and the electromagnetic ultrasonic wave and the ultrasonic wave are emitted to said liquid containing said colloidal particles to separate and flocculate the suspended solids; the electromagnetic ultrasonic wave is emitted to the liquid to deodorize said liquid, and a high-voltage pulse is applied to the liquid to separate off nitrogen compounds and at the same time, to produce ozone to deodorize and sterilize said liquid.

4. A liquid treating process according to claim 3, wherein after the application of the high-voltage pulse to the liquid, said liquid is passed through an intensive magnetic field, whereby said liquid is subjected to a disintegrating treatment.

5. A liquid treating apparatus comprising a microwave generator for generating a microwave which is an electromagnetic wave to separate a liquid containing colloidal particles into the colloidal particles and liquid molecules, an ultrasonic wave generator for generating a ultrasonic wave to flocculate said colloidal particles, an electromagnetic ultrasonic wave generator for generating an electromagnetic ultrasonic wave to remove an offensive odor from said liquid, and a settling means for separating the flocculated colloidal particles from the liquid.

6. A liquid treating apparatus according to claim 5, wherein the ultrasonic wave generated from said ultrasonic wave generator has a frequency equal to or lower than 100 kHz, and the electromagnetic ultrasonic wave generated from said electromagnetic ultrasonic wave generator has a frequency in a range of 3 to 300 MHz.

7. A liquid treating apparatus according to claim 5 or 6, further including a high-voltage pulse generator for generating a high-voltage pulse to separate the nitrogen compounds from the liquid and at the same time, to produce ozone to deodorize and sterilize the liquid.

8. A liquid treating apparatus according to claim 7, further including a magnetic field forming means, for forming a magnetic field for the disintegrating treatment of the liquid.

9. A liquid treating apparatus according to any of claims 5 to 6, further including a magnetic field forming means for forming a magnetic field for subjecting the liquid to a disintegrating treatment.

10. A liquid treating system comprising a separating means for emitting an microwave which is an electromagnetic wave to a liquid containing colloidal particles to separate the liquid into the colloidal particles and liquid molecules, a flocculating means for emitting an ultrasonic wave to the liquid resulting from the separation of the colloidal particles, thereby flocculating said colloidal particles, a deodorizing means for emitting an electromagnetic ultrasonic wave to the liquid to deodorize said liquid, a high-voltage pulse treating means for applying a high-voltage pulse to said liquid to separate and remove nitrogen compounds from said liquid and at the same time, to produce ozone to deodorize and sterilize said liquid, a flocculate discharging means for attracting flocculates of said colloidal particles by a magnetic force to discharge them, and a settling means for separating the flocculated colloidal particles from liquid.

11. A liquid treating system according to claim 10, further including a disintegrating means for subjecting the liquid to a disintegrating treatment by passing the liquid through a magnetic field.

12. A liquid treating system according to claim 10 or 11, further including an oxidizing/reducing means for delivering and receiving electrons to and from the electrically charged liquid to effect an oxidizing/reducing reaction.

13. A liquid treating system according to claim 12, wherein the ultrasonic wave emitted by the flocculating means has a frequency equal to or lower than 100 kHz, and the electromagnetic ultrasonic wave emitted by the deodorizing means has a frequency in a range of 3 to 300 MHz.

14. A liquid treating system according to any of claims 10 to 11, wherein the ultrasonic wave emitted by the flocculating means has a frequency equal to or lower than 100 kHz, and the electromagnetic ultrasonic wave emitted by the deodorizing means has a frequency in a range of 3 to 300 MHz.

15. A liquid treating system comprising:
a flocculating device having an electrically charging/cell-destructing means which includes an AC high-voltage electrode means for applying a high-voltage pulse to separate and flocculate colloidal particles of water-soluble organic substances and microorganisms from a colloidal particle-containing liquid and to destruct cells of the microorganisms;
a flocculation accelerating device which includes a microwave separating means for emitting a microwave which is an electromagnetic wave to said liquid to separate said liquid into the colloidal particles and liquid molecules, a first ultrasonic wave flocculating means for emitting a ultrasonic wave of a frequency in a range of 40 k to 1,200 kHz to the liquid treated by the emission of the microwave, thereby flocculating said colloidal particles, and a deodorizing means adapted to emit an electromagnetic ultrasonic wave to said liquid; and
a settling device which includes a flocculate settling means adapted to pass the liquid containing flocculates of said colloidal particles through a lattice-shaped electrically separating membrane having a high voltage applied thereto, thereby adsorbing the flocculates to the electrically separating membrane, and settling the flocculates by changing the direction of application of the high voltage.

16. A liquid treating system according to claim 15, wherein said flocculation accelerating device is provided with an oxidizing/reducing means including a DC high-voltage electrode means for applying a DC high voltage to the liquid containing the colloidal particles to promote the oxidizing/reducing reaction of the liquid and to decompose carbon compounds.

17. A liquid treating system according to claim 16, wherein said DC high-voltage electrode means comprises two anodes and a single cathode.

18. A liquid treating system according to claim 17, wherein said cathode of said AC high-voltage electrode means is formed of a magnesium-based, material.

19. A liquid treating system according to claim 17, wherein each of the electrodes of said AC high-voltage electrode means is formed of a platinum-tanium alloy material.

20. A liquid treating system according to claim 17, wherein each of the electrodes of said DC high-voltage electrode means is formed of a copper-tungsten alloy material.

21. A liquid treating system according to 17, wherein said microwave generated in said flocculation accelerating device has a frequency set in a range of 2.4 to 10.5 GHz.

22. A liquid treating system according to claim 16, wherein said cathode of said DC high-voltage electrode means is formed of a magnesium-based material.

23. A liquid treating system according to 22, wherein said microwave generated in said flocculation accelerating device has a frequency set in a range of 2.4 to 10.5 GHz.

24. A liquid treating system according to claim 16, wherein each of the electrodes of said AC high-voltage eletrodemeans is formed of a platinum-titanium alloy material.

25. A liquid treating system according to 24, wherein said microwave generated in said flocculation accelerating device has a frequency set in a range of 2.4 to 10.5 GHz.

26. A liquid treating system according to any of claims 16 or 24, wherein each of the electrodes of said DC high-voltage electrode means is formed of a copper-tungsten alloy material.

27. A liquid treating system according to 26, wherein said microwave generated in said flocculation accelerating device has a frequency set in a range of 2.4 to 10.5 GHz.

28. A liquid treating system according to claim 15 or 16, wherein said flocculation accelerating device is provided with a disintegrating/electrically charging means adapted to permit the liquid containing the colloidal particles to be passed therethrough, while being mixed by blades embedded in a plurality of magnets in a direction of flowing of the liquid in a pipe having a magnetic field formed therein, thereby disintegrating the liquid molecules and the colloidal particles to electrically charge them, and adsorbing the colloidal particles to one another.

29. A liquid treating system according to claim 28, wherein said flocculation accelerating device has a completely separating means disposed therein for completely separating the colloidal particles from the liquid molecules by emitting an electromagnetic wave having a frequency in a range of 100 to 500 MHz to the liquid containing the colloidal particles to generate an induction plasma.

30. A liquid treating system according to claim 28, wherein said AC high-voltage electrode means comprises two anodes and a single cathode.

31. A liquid treating system according to claim 28, wherein said cathode of said AC high-voltage electrode means is formed of a magnesium-based material.

32. A liquid treating system according to claim 28, wherein each of the electrodes of said AC high-voltage electrode means is formed of a platinum-titanium alloy material.

33. A liquid treating system according to claim 28, wherein said microwave generated in said flocculation accelerating device has a frequency set in a range of 2.4 to 10.5 GHz.

34. A liquid treating system according to claim 15 or 16, wherein said flocculation accelerating device is provided with a second ultrasonic wave flocculating means adapted to emit ultrasonic waves having frequencies of 28 kHz, 40 kHz, 48 kHz and 100 kHz to the liquid containing the colloidal particles.

35. A liquid treating system according to claim 34, wherein said flocculation accelerating device has a completely separating means disposed therein for completely separating the colloidal particles from the liquid molecules by emitting an electromagnetic wave having a frequency in a range of 100 to 500 MHz to the liquid containing the colloidal particles to generate an induction plasma.

36. A liquid treating system according to claim 34, wherein said AC high-voltage electrode means comprises two anodes and a single cathode.

37. A liquid treating system according to claim 34, wherein said cathode of said AC high-voltage electrode means is formed of a magnesium-based material.

38. A liquid treating system according to claim 34, wherein each of the electrodes of said AC high-voltage electrode means is formed of a platinum-titanium alloy material.

39. A liquid treating system according to 34, wherein said microwave generated in said flocculation accelerating device has a frequency set in a range of 2.4 to 10.5 GHz.

40. A liquid treating system according to any of claims 15 to 16, wherein said flocculation accelerating device has a completely separating means disposed therein for completely separating the colloidal particles from the liquid molecules by emitting an electromagnetic wave having a frequency in a range of 100 to 500 MHz to the liquid containing the colloidal particles to generate an induction plasma.

41. A liquid treating system according to claim 40, wherein said AC high-voltage electrode means comprises two anodes and a single cathode.

42. A liquid treating system according to claim 40, wherein said cathode of said AC high-voltage electrode means is formed of a magnesium-based material.

43. A liquid treating system according to claim 40, wherein each of the electrodes of said AC high-voltage electrode means is formed of a platinum-tanium alloy material.

44. A liquid treating system according to 40, wherein said microwave generated in said flocculation accelerating device has a frequency set in a range of 2.4 to 10.5 GHz.

45. A liquid treating system according to any of claims 15 to 16, wherein said AC high-voltage electrode means comprises two anodes and a single cathode.

46. A liquid treating system according to claim 45, wherein said cathode of said AC high-voltage electrode means is formed of a magnesium-based material.

47. A liquid treating system according to claim 45, wherein each of the electrodes of said AC high-voltage electrode means is formed of a platinum-titanium alloy material.

48. A liquid treating system according to claim 45, wherein each of the electrodes of said DC high-voltage electrode means is formed of a copper-tungsten alloy material.

49. A liquid treating system according to 45, wherein said microwave generated in said flocculation accelerating device has a frequency set in a range of 2.4 to 10.5 GHz.

50. A liquid treating system according to any of claims 15 to 16, wherein said cathode of said AC high-voltage electrode means is formed of a magnesium-based material.

51. A liquid treating system according to claim 50, wherein each of the electrodes of said AC high-voltage electrode means is formed of a platinum-titanium alloy material.

52. A liquid treating system according to 50, wherein said microwave generated in said flocculation accelerating device has a frequency set in a range of 2.4 to 10.5 Hz.

53. A liquid treating system according to any of claims 15 to 16, wherein said microwave generated in said flocculation accelerating device has a frequency set in a range of 2.4 to 10.5 GHz.

* * * * *